(12) United States Patent
Naito et al.

(10) Patent No.: US 7,088,234 B2
(45) Date of Patent: Aug. 8, 2006

(54) WEARING INFORMATION NOTIFYING UNIT

(75) Inventors: Eiichi Naito, Kyoto (JP); Jun Ozawa, Nara (JP); Takeo Azuma, Nara (JP); Kenya Uomori, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 165 days.

(21) Appl. No.: 10/471,638

(22) PCT Filed: Nov. 27, 2002

(86) PCT No.: PCT/JP02/12397

§ 371 (c)(1),
(2), (4) Date: Sep. 12, 2003

(87) PCT Pub. No.: WO03/046732

PCT Pub. Date: Jun. 5, 2003

(65) Prior Publication Data

US 2004/0100389 A1    May 27, 2004

(30) Foreign Application Priority Data

Nov. 27, 2001  (JP)  .............................. 2001-360546
Nov. 27, 2001  (JP)  .............................. 2001-360548

(51) Int. Cl.
*G08B 1/08* (2006.01)

(52) U.S. Cl. .............................. 340/539.11; 340/539.25; 345/8

(58) Field of Classification Search ........... 340/539.11, 340/539.25, 573.1; 348/739; 345/7, 8
See application file for complete search history.

(56) References Cited

U.S. PATENT DOCUMENTS

| | | | | |
|---|---|---|---|---|
| 5,003,300 A | * | 3/1991 | Wells | 345/8 |
| 6,167,413 A | * | 12/2000 | Daley, III | 708/139 |
| 6,359,602 B1 | * | 3/2002 | Amafuji et al. | 345/8 |
| 6,457,024 B1 | * | 9/2002 | Felsentein et al. | 345/8 |
| 6,633,267 B1 | | 10/2003 | Numa | |
| 6,774,869 B1 | * | 8/2004 | Biocca et al. | 345/8 |
| 6,798,391 B1 | * | 9/2004 | Peterson, III | 345/8 |

FOREIGN PATENT DOCUMENTS

| | | |
|---|---|---|
| JP | 02-303285 | 12/1990 |
| JP | 07-288725 | 10/1995 |
| JP | 10-161227 | 6/1998 |
| JP | 10-322624 A | 12/1998 |
| JP | 11-072348 | 3/1999 |
| JP | 11-142782 A | 5/1999 |
| JP | 2000-134253 A | 5/2000 |
| JP | 2000-244613 A | 9/2000 |

(Continued)

OTHER PUBLICATIONS

International Search Report for International Application PCT/JP02/12397 mailed Jan. 14, 2003; ISA/JPO.

(Continued)

*Primary Examiner*—Toan N. Pham
(74) *Attorney, Agent, or Firm*—Harness, Dickey & Pierce, P.L.C.

(57) ABSTRACT

When a user wears a headset (12), a small display (107) is provided in front of an eye of the user. A main component (11) communicates with an external device to receive information, such as an electronic mail. The main component (11) extracts a portion of the received information, e.g., data about a sender, and transmits the extracted portion to a headset (12). The headset (12) displays the received information on the small display (107).

8 Claims, 29 Drawing Sheets

(a)

(b)

FOREIGN PATENT DOCUMENTS

| | | |
|---|---|---|
| JP | 2000-298246 A | 10/2000 |
| JP | 2000-330883 A | 11/2000 |
| JP | 2001-22362 A | 1/2001 |
| JP | 2001-34546 A | 2/2001 |
| JP | 2001-101096 A | 4/2001 |
| JP | 2001-141475 A | 5/2001 |
| JP | 2001-154936 A | 6/2001 |
| JP | 2001-189902 | 7/2001 |

OTHER PUBLICATIONS

Notice of Reasons of Rejection for Japanese Patent Application No. 2003-548524 and English Translation; Mailed Sep. 14, 2004.

* cited by examiner (a)              (b)

| Brightness of external environment | Display mode |
|---|---|
| Very dark | Display with a little bit less brightness |
| Dark | Display with normal brightness |
| Normal | Display with a little bit more brightness |
| Bright | Display brightly with flashing |

FIG. 34
(a) 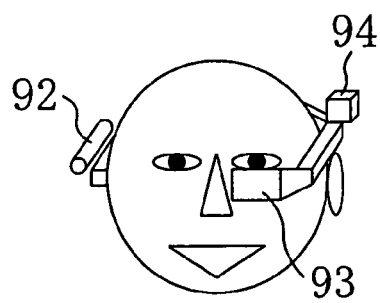
(b) 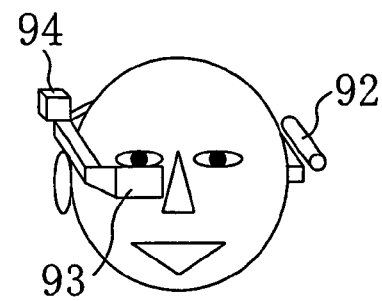
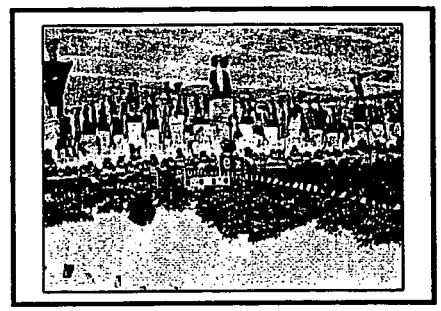
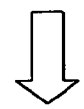

Image displayed on small display

WEARING INFORMATION NOTIFYING UNIT

This application is a 371 of PCT/JP02/12397, filed Nov. 27, 2002.

TECHNICAL FIELD

The present invention relates to a wearable information notifying device which is designed to be wearable for a user and which can notify the user of information, e.g., information about arrival of a mail, etc., without imposing a burden on the user.

BACKGROUND ART

In recent years, transmission/reception of mails, distribution of electronic newspapers, and the like, have been actively carried out using mobile terminals. When certain information is distributed to a mobile terminal of a user, the user is notified about it by an arrival sound or vibration even during the time when the user is enjoying a chat with another person in an actual world or even when the user is in the midst of an important business meeting. The notified user can take out the mobile terminal to check the content of the distributed information.

However, if the user hears an arrival sound in the midst of a conversation with a person and takes out his/her mobile terminal to check the content of the distributed information, such a manner sometimes makes the person uncomfortable. If an arrival sound is emitted during an important meeting, the user needs to take out a mobile terminal in order to check the content of a mail even though the mail is not important, and such labor troubles the user. Although such troublesome labor may be removed by assigning different arrival sounds to different mail senders, such a method is not much effective because it is still necessary to take out the mobile terminal in order to check the content of the information.

One possible method for solving the above problem is to fixedly provide a small display in front of an eye of the user and display information on the small display when a mail, or the like, is arrived. With such a method, the user can confirm information about arrival of a mail without being noticed by other people.

Patent Publication 1 discloses a goggle-type headset which has a small display. Patent Publication 2 discloses a technique of displaying received information on a small display worn by a user.

(Patent Publication 1) Japanese Unexamined Patent Publication No. 10-322624

(Patent Publication 2) Japanese Unexamined Patent Publication No. 2001-101096

Problems to be Solved

However, a small display which can be fixedly provided in front of an eye generally has poor display performance, i.e., is not suitable for display of a large amount of information. Furthermore, in the case where a small display is actually used, it is difficult for a user to instantly recognize displayed information because of the nature of human eyes.

An objective of the present invention, which is established in view of the above problems, is to provide received information in such a manner that a user can instantly determine the degree of importance of the received information in a wearable information notifying device including a headset which has a small display that can be provided in front of an eye of a wearer.

DISCLOSURE OF INVENTION

A wearable information notifying device of the present invention includes: a headset having a small display which can be provided in front of an eye of a wearer; an information reception section for communicating with an external device to receive information; and an information extraction section for extracting a portion of the information received by the information reception section which is to be displayed on the small display.

With such a structure, a portion of the information received by the information reception section, which is extracted by the information extraction section, is displayed on the small display provided in front of the eye of the wearer. Thus, the user can instantly perceive the content of the information without being noticed by other people before the user confirms the entire information.

The wearable information notifying device of the present invention preferably includes a display for displaying the information received by the information reception section.

The wearable information notifying device of the present invention preferably includes: a transmission section for transmitting an output of the information extraction section by wireless; and a reception section for receiving a transmission from the transmission section to output the received transmission to the small display.

The information extraction section of the wearable information notifying device of the present invention preferably extracts information about a sender of the information received by the information reception section.

The information extraction section of the wearable information notifying device of the present invention preferably extracts information about the degree of importance of the information received by the information reception section.

The information extraction section of the wearable information notifying device of the present invention preferably extracts a keyword picked up from a sentence included in the information received by the information reception section.

Further, the information extraction section preferably outputs the extracted information together with predetermined color information added thereto.

The information extraction section of the wearable information notifying device of the present invention preferably extracts color classification information which is set for a character string included in the information received by the information reception section.

In the wearable information notifying device of the present invention, the headset preferably includes an earphone, and the wearable information notifying device preferably includes a sound notifying section for outputting a sound signal to the earphone based on the information output from the information extraction section.

In the wearable information notifying device of the present invention, the headset preferably includes a vibrating section for providing a vibration, and the wearable information notifying device preferably includes a vibratory notification section for outputting a vibration signal to the vibrating section based on the information output from the information extraction section.

The headset of the wearable information notifying device of the present invention preferably includes a display control section for controlling the display mode of the small display according to a given control signal.

The display control section preferably controls the brightness of the small display or controls whether or not to perform display on the small display.

The wearable information notifying device preferably includes an environment detection section for detecting an environmental state around the headset and supplying the control signal to the display control section according to the detected environmental state. Further, the environment detection section preferably detects the brightness of surroundings as the environmental state.

The wearable information notifying device preferably includes an environmental information reception section for receiving environmental information which represents an environmental state around the headset and supplying the control signal to the display control section according to the received environmental information. Further, the environmental information reception section preferably receives the velocity of a car driven by the human as the environmental information.

The headset of the wearable information notifying device of the present invention preferably includes a driving mechanism for shifting the small display between a position in front of the eye of the wearer and a position not in front of the eye of the wearer, and a drive control section for controlling an operation of the driving mechanism based on the information output from the information extraction section.

The wearable information notifying device includes an environmental information reception section for receiving environmental information which represents an environmental state around the headset and supplying the received environmental information to the drive control section, wherein the drive control section controls the operation of the driving mechanism while additionally considering the environmental information.

A wearable information notifying device of the present invention includes: a headset having a small display which can be provided in front of an eye of a wearer; an information reproduction section for reproducing a media in which information is stored; and an information extraction section for extracting a portion of the information reproduced by the information reproduction section which is to be displayed on the small display.

BRIEF DESCRIPTION OF DRAWINGS

FIG. 21 is an example of a table stored in a display control section in FIG. 20.

FIG. 34 shows display examples of a small display of the wearable information notifying device of FIG. 33.

BEST MODE FOR CARRYING OUT THE INVENTION

Hereinafter, embodiments of the present invention will be described with reference to the drawings.

(Embodiment 1)

Figure 1:
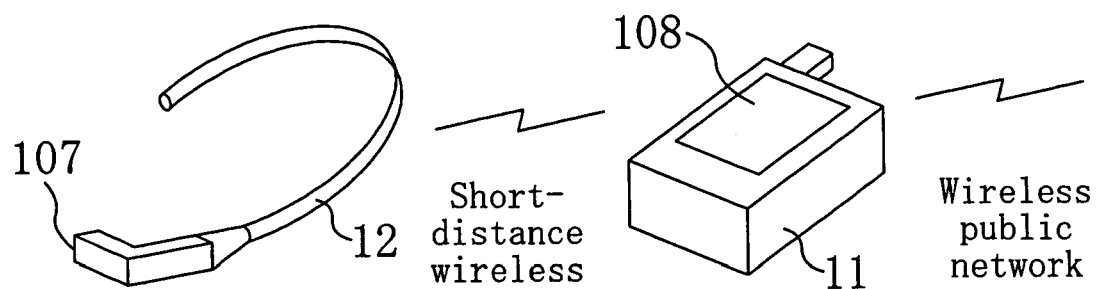
FIG. 1 shows an exterior of a wearable information notifying device according to embodiment 1 of the present invention.

FIG. 1 shows an exterior of a wearable information notifying device according to embodiment 1 of the present invention. In FIG. 1, reference numeral 11 denotes a main component which communicates with an external device to receive information, and reference numeral 12 denotes a headset which is to be worn by a user. The main component 11 has a large display 108 having a size similar to that of a cellular phone, or the like. The headset 12 has a shape such that it is attached substantially horizontally at the head of the user by a flexible headband (Katyusha). The headset 12 has a small display 107 at one end of the headband.

Figure 2:
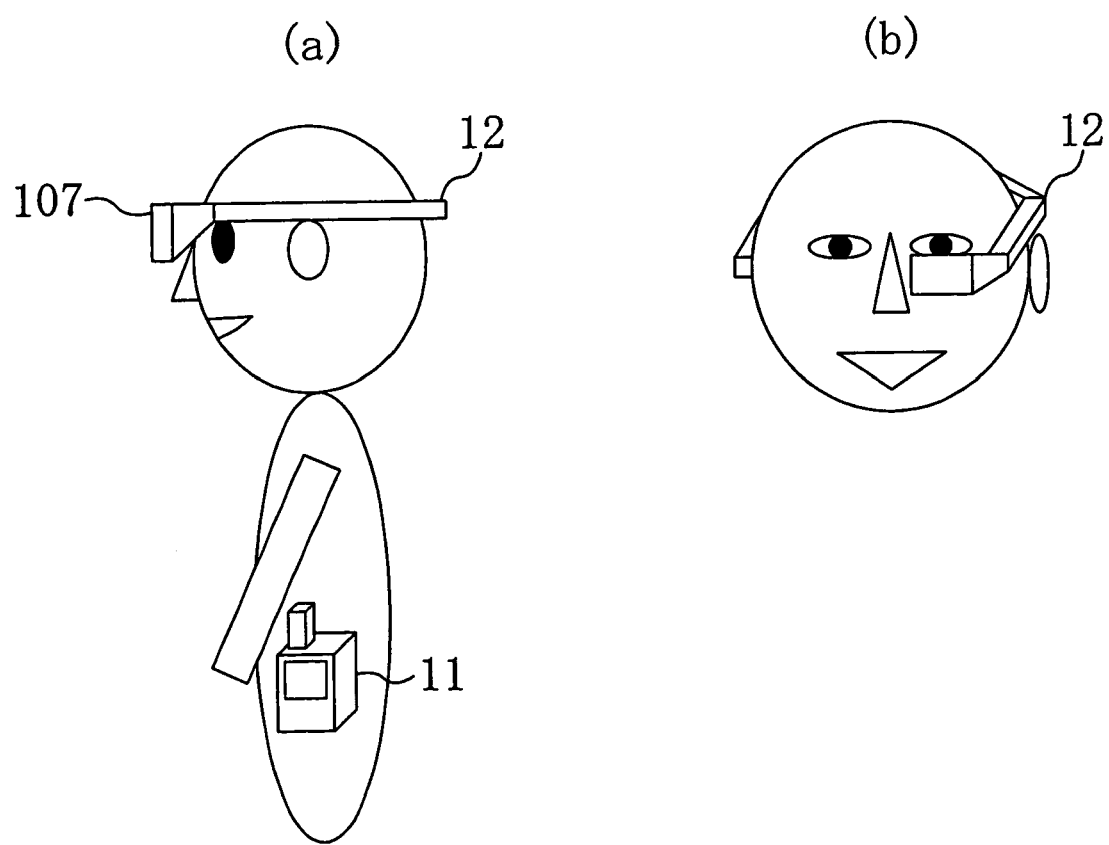
FIG. 2 shows a user who wears the wearable information notifying device of FIG. 1.

FIG. 2 shows a user who wears the wearable information notifying device of FIG. 1. In FIG. 1, part (a) is a side view, and part (b) is a front view. When the user wears the headset 12, the small display 107 is placed in front of an eye of the wearer so as to be within the view field of the wearer. The main component 11 is held at a belt, in a pocket, or the like, of the user.

Figure 3:
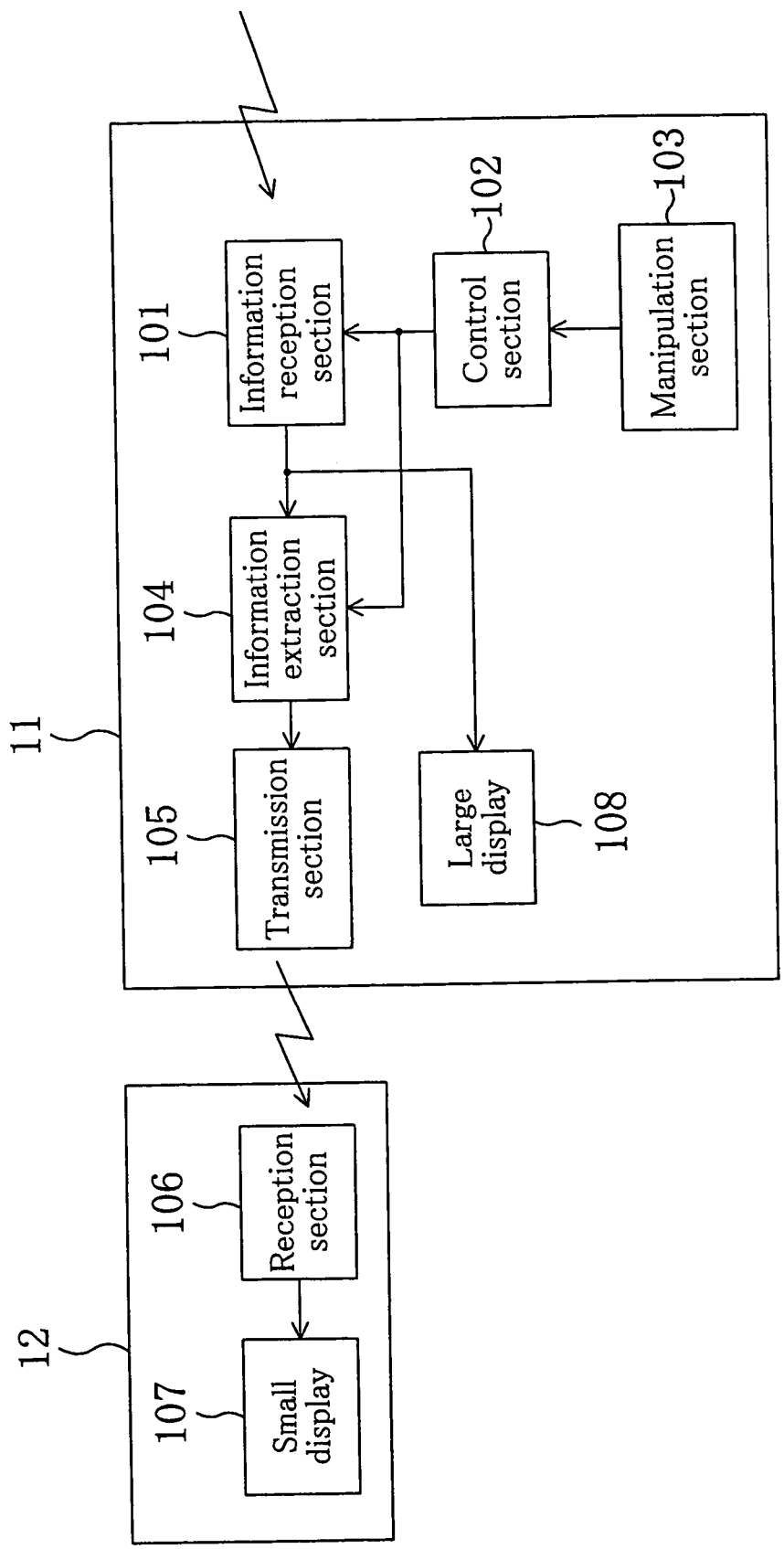
FIG. 3 is a functional block diagram of the wearable information notifying device of FIG. 1.

FIG. 3 is a functional block diagram of the wearable information notifying device of FIG. 1. In FIG. 3, reference numeral 101 denotes an information reception section for communicating with an external device to receive information; reference numeral 102 denotes a control section for controlling the information reception section; reference numeral 103 denotes a manipulation section for receiving a manipulation of the control section 102 from a user; reference numeral 104 denotes an information extraction section for extracting a part of the information received by the information reception section 101 to be displayed on the small display 107; reference numeral 105 denotes a transmission section for transmitting the information extracted by the information extraction section 104 to the headset 12; and reference numeral 106 denotes a reception section for receiving information from the main component 11.

Figure 4:
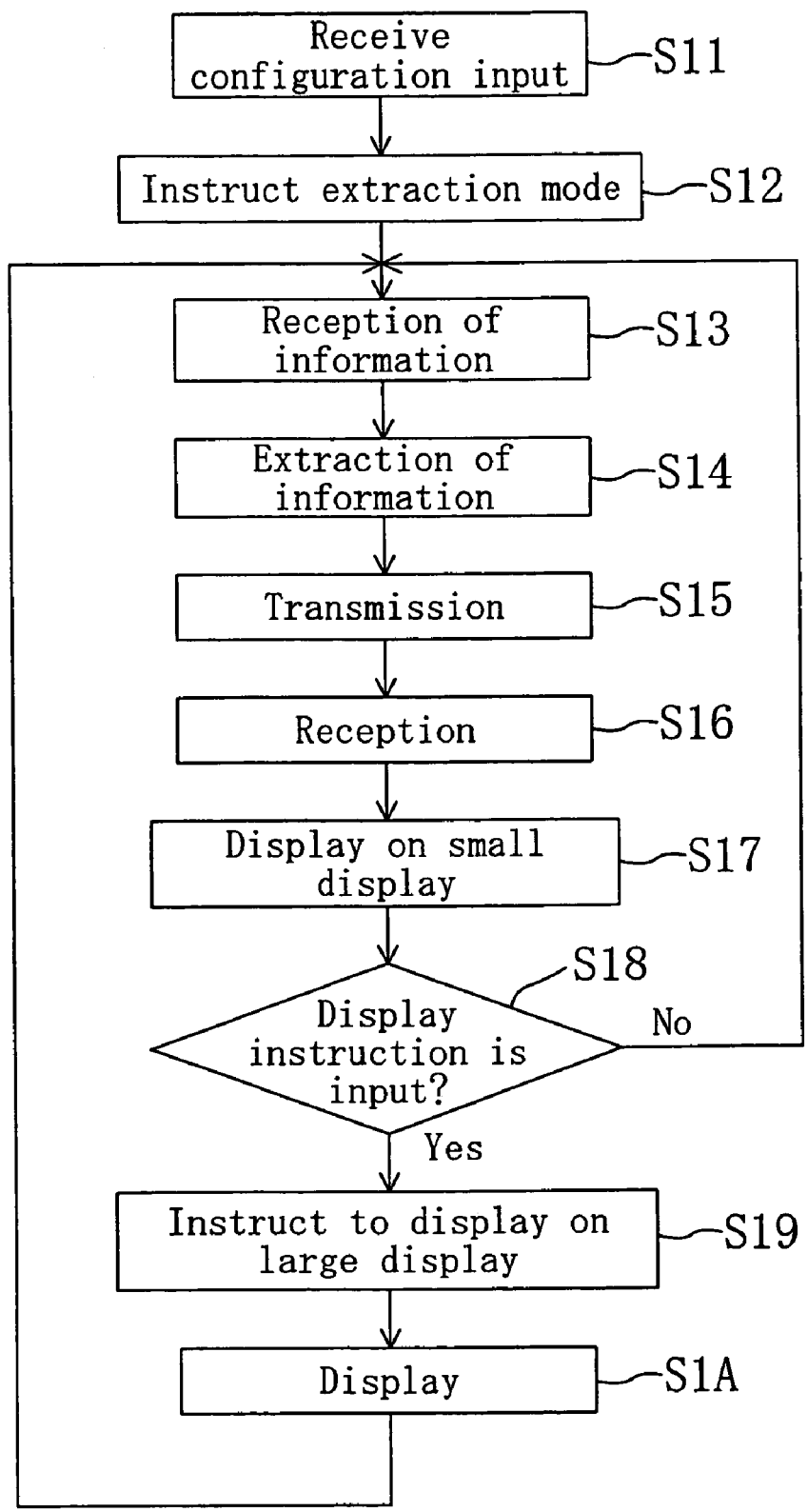
FIG. 4 is a flowchart showing an operation of the wearable information notifying device of FIG. 1.

An operation of the wearable information notifying device according to this embodiment which has the above-described structure is described with reference to the flowchart of FIG. 4. Here, we consider a case where the information reception section 101 is connected to a wireless public network and receives an electronic mail as externally supplied information.

[Step S11]

The manipulation section 103 receives from a user a configuration input concerning particulars to be displayed on the small display 107. The particulars which can be input by the user include: selection of the mail attribute to be displayed ("sender", "title", "degree of importance", "keyword"); the condition for an attribute value of the mail attribute to be displayed; the correspondence between the attribute value of the mail attribute and the character color or background color; and the on/off of a flashing operation in the display. For example, the user can determine the configuration such that: the "keyword" is displayed as the mail attribute; characters are displayed in "red" if the "keyword" includes "C"; and the display is carried out according to the "flashing operation". Alternatively, characters may be displayed in, for example, "green" when a mail from a specified user is received. Characters may be displayed in, for example, "blue" when an important keyword is included in the title or information. Characters may be displayed in, for example, "yellow" when a mail whose degree of importance is set by a sender is received. Still alternatively, the sender may designate the color of characters to be displayed.

[Step S12]

Based on the input at step S11, the control section 102 instructs the information reception section 101 to start receiving information and instructs the information extraction section 104 about the mode for extracting information.

[Step S13]

The information reception section 101 communicates with an external mail server (not shown) through the wireless public network at a predetermined time interval to receive a newly-arrived electronic mail. Then, the information reception section 101 stores the received electronic mail and sends it to the information extraction section 104.

[Step S14]

Based on the input at step S11, the information extraction section 104 extracts the sender, title, degree of importance, or keyword, from the information received by the information reception section 101, and sends to the transmission section 105 a display signal including the extracted information and the display attributes concerning the display color and flashing operation.

[Step S15]

The transmission section 105 transmits the display signal extracted at step S14 to the headset 12 by a short-distance wireless.

[Step S16]

The reception section 106 receives the display signal transmitted at step S15 by a short-distance wireless.

[Step S17]

The reception section 106 reproduces the display signal received at step S16 through the small display 107.

[Step S18]

The manipulation section 103 receives from the user an instruction to display on the large display 108 the mail received and stored at step S13. If such an instruction is made within a predetermined time period, the process proceeds to step S19. If not, the process returns to step S13.

[Step S19]

Based on the instruction received at step S18, the control section 102 instructs the information reception section 101 to perform a display on the large display 108.

[Step S1A]

The information reception section 101 displays on the large display 108 a list of mails received and stored at step S13. When the list is displayed, the display can be changed to the content of a selected mail, and when the content of the selected mail is displayed, the display can be changed to the list, by a manipulation of the user. If a manipulation of the user is not made within a predetermined time period, the display shown on the large display 108 is deleted, and the process returns to step S13.

Figure 5:
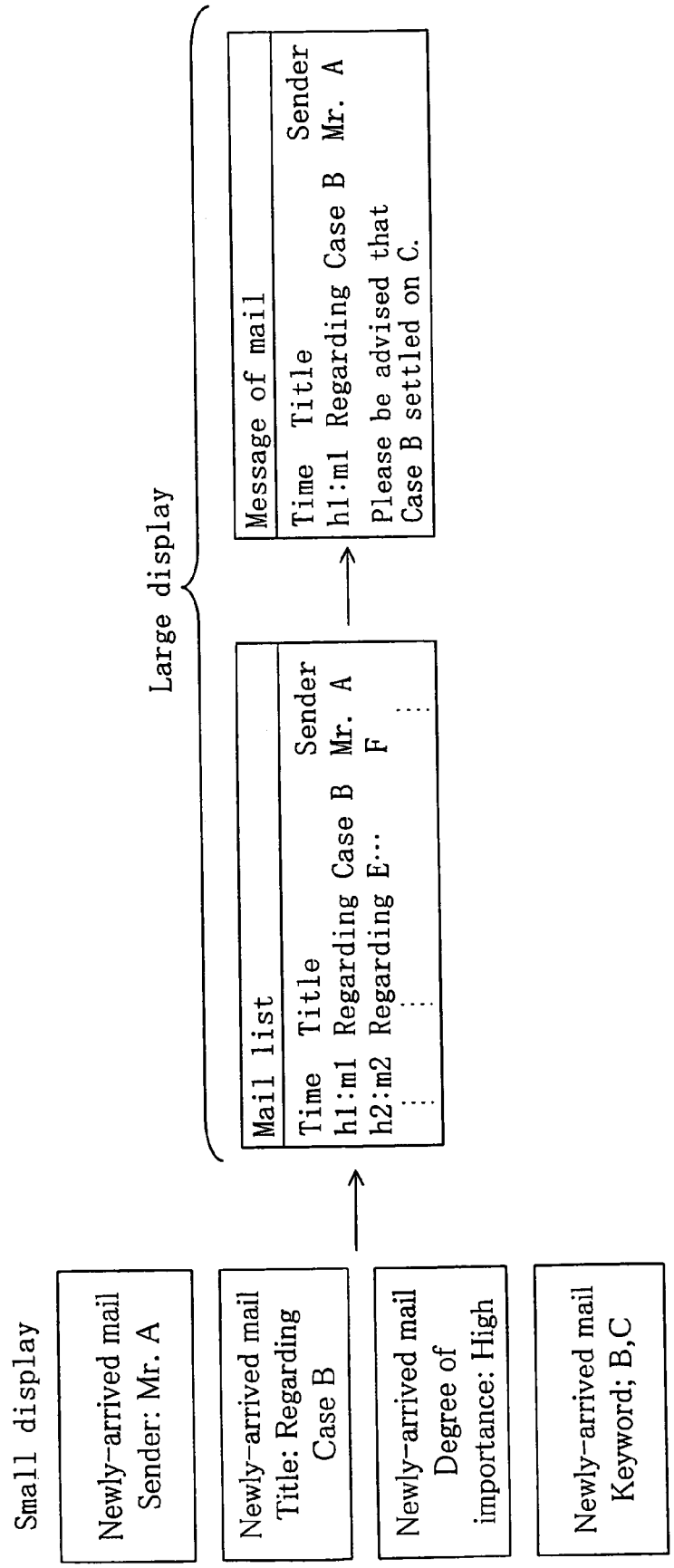
FIG. 5 is a display example which is obtained in embodiment 1.

FIG. 5 shows display examples of the small display 107 and the large display 108 which result from the above-described operation. In FIG. 5, arrival of a mail and a mail attribute selected by the user (any of "sender", "title", "degree of importance", and "keyword") are displayed on the small display 107. Thereafter, a mail list and the content of a mail are displayed on the large display 108 according to a manipulation of the user. Alternatively, only a color may be displayed on the small display, or the display may be flashed.

As described above, according to this embodiment, arrival of a mail and a portion of the content of the mail are displayed on the display provided in front of an eye of the user, whereby the user can be notified about arrival of the mail without taking out the main component.

Furthermore, by using color information, the user can perceive general matters of the content of a received mail without carefully watching the small display.

In another possible application, when a user viewing information on the large display reads an important piece of information, information indicating the degree of importance of the piece of information is displayed on the small display. That is, when the user carefully watching the large display reaches an important piece of information, color information, or the like, is displayed on the small display, whereby the user's attention can be called to the piece of information while keeping the user carefully watching the large display.

(Embodiment 2)

In embodiment 1 described above, information is notified using a small display, whereas in embodiment 2, information is further notified by a sound using an earphone.

Figure 6:
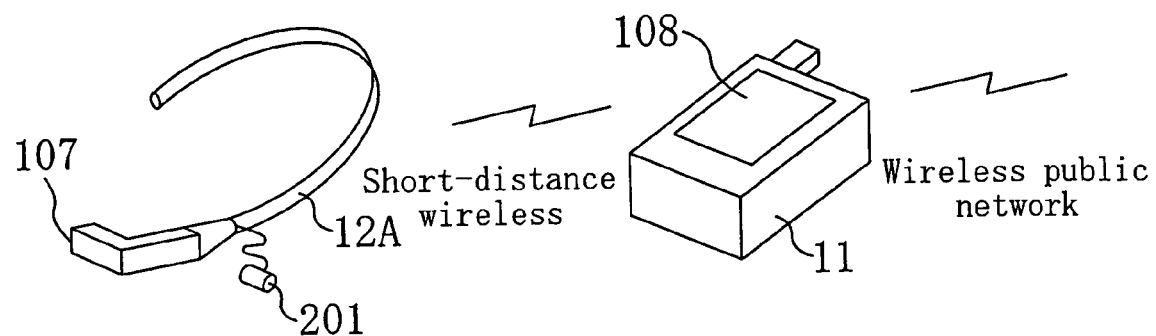
FIG. 6 shows an exterior of a wearable information notifying device according to embodiment 2 of the present invention.
Figure 7:
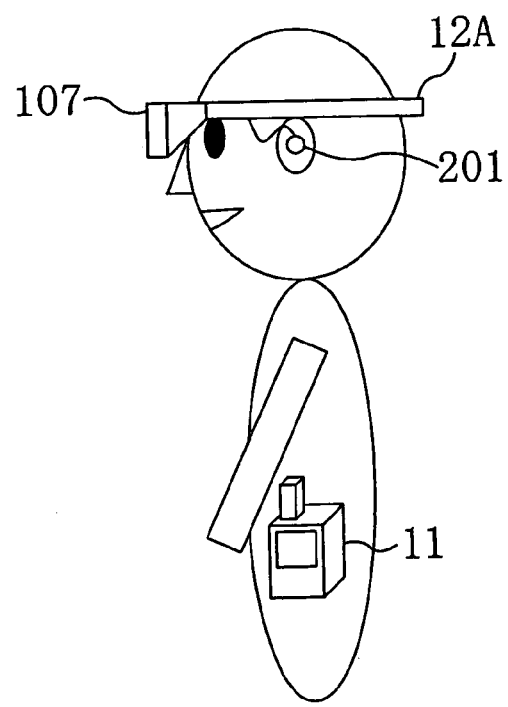
FIG. 7 shows a user who wears the wearable information notifying device of FIG. 6.
Figure 8:
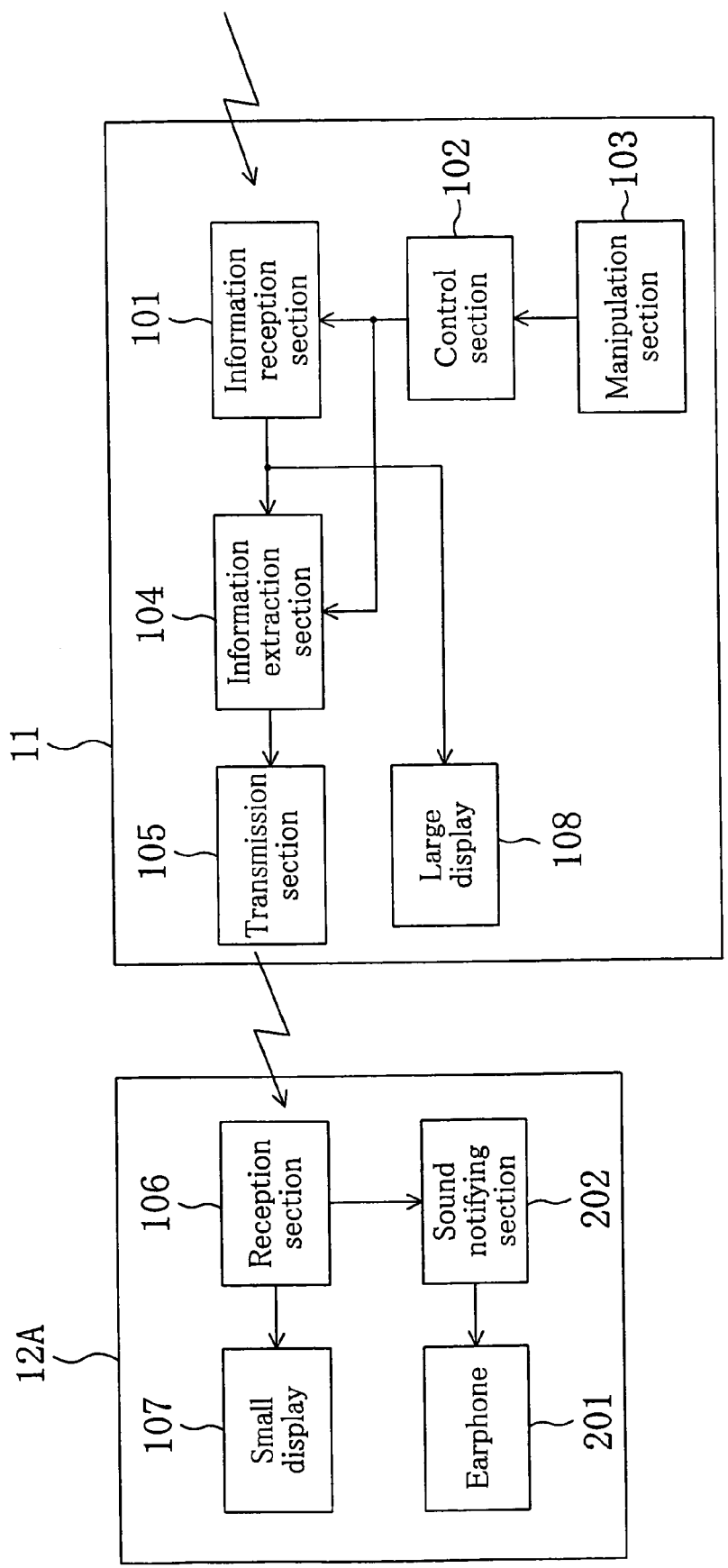
FIG. 8 is a functional block diagram of the wearable information notifying device of FIG. 6.

FIG. 6 shows an exterior of a wearable information notifying device according to this embodiment. FIG. 7 shows a user who wears the wearable information notifying device of FIG. 6. FIG. 8 is a functional block diagram of the wearable information notifying device of FIG. 6. In FIGS. 6 through 8, like elements are denoted by like reference numerals used in FIGS. 1 through 3 of embodiment 1, and therefore, detailed descriptions thereof are herein omitted. Embodiment 2 is different from embodiment 1 in that a headset 12A includes an earphone 201, which is put in the ear, and a sound notifying section 202 which outputs a sound signal to the earphone 201 based on information output from the information extraction section 104.

Figure 9:
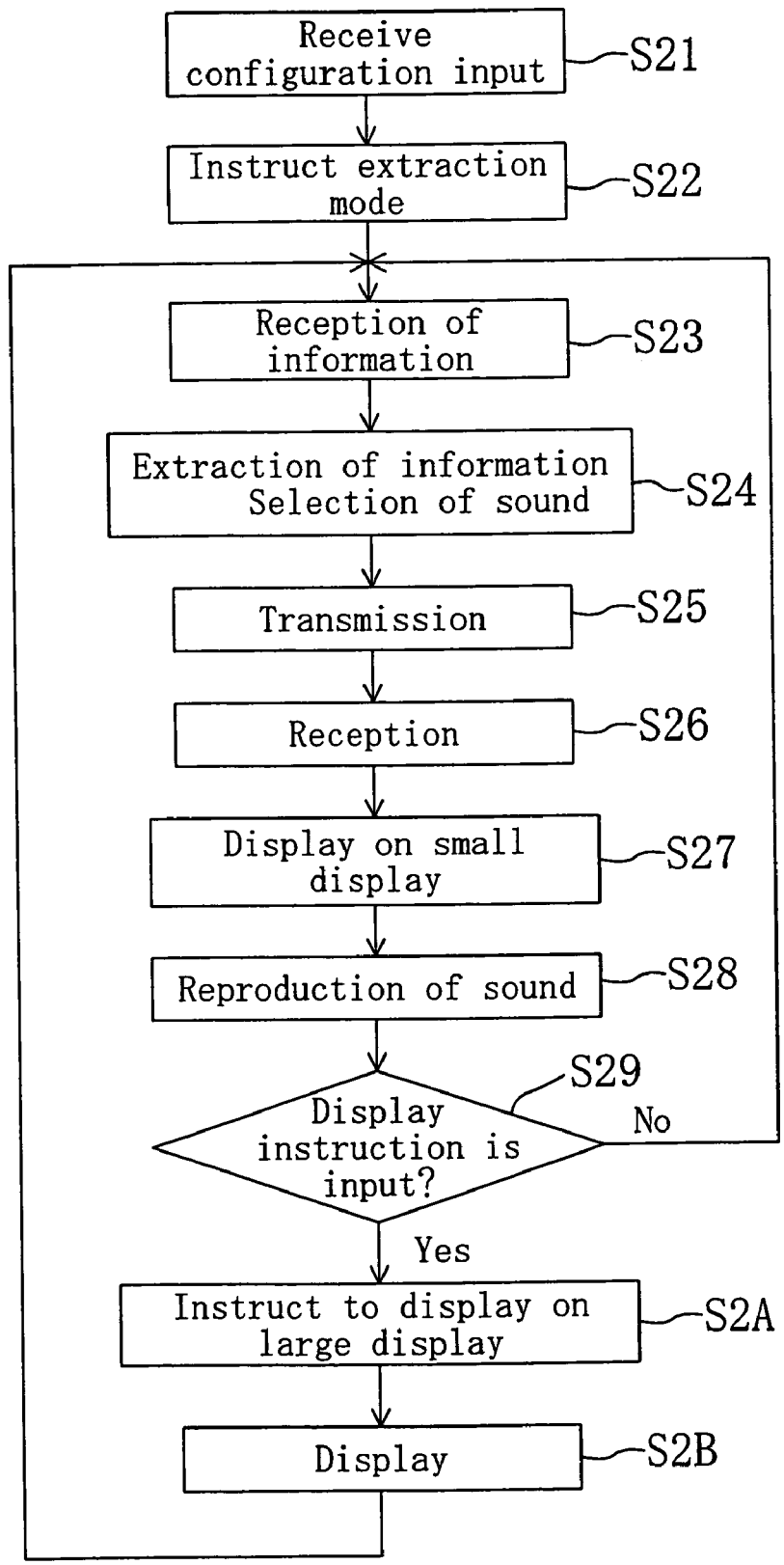
FIG. 9 is a flowchart showing an operation of the wearable information notifying device of FIG. 6.

An operation of the wearable information notifying device according to this embodiment which has the above-described structure is described with reference to the flowchart of FIG. 9. Here also, we consider a case where the information reception section 101 is connected to a wireless public network and receives an electronic mail as externally supplied information, as described in embodiment 1.

[Step S21]

The manipulation section 103 receives from a user a configuration input concerning particulars to be displayed on the small display 107 and a sound to be reproduced through the earphone 201. The particulars which can be input by the user include: selection of the mail attribute to be displayed ("sender", "title", "degree of importance", "keyword"); the condition for an attribute value of the mail attribute to be displayed; the correspondence between the attribute value of the mail attribute and the character color or background color; and the on/off of a flashing operation in the display; and additionally, the correspondence between the attribute value of the mail attribute and the sound; and the setting of the volume or volume transition. For example, the user can determine the configuration such that: the "keyword" is displayed as the mail attribute; characters are displayed in "red" if the "keyword" includes "C"; the display is carried out according to the "flashing operation"; and "effect sound H" is reproduced "at a gradually increasing volume".

[Step S22]

Based on the input at step S21, the control section 102 instructs the information reception section 101 to start receiving information and instructs the information extraction section 104 about the mode for extracting information.

[Step S23]

The information reception section 101 communicates with an external mail server (not shown) through the wireless public network at a predetermined time interval to receive a newly-arrived electronic mail. Then, the information reception section 101 stores the received electronic mail and sends it to the information extraction section 104.

[Step S24]

Based on the input at step S21, the information extraction section 104 extracts the sender, title, degree of importance, or keyword, from the information received by the information reception section 101, and sends to the transmission section 105 a display signal including the extracted information and the display attributes concerning the display color and flashing operation. Furthermore, the information extraction section 104 selects from among a plurality of sounds previously stored in the main component 11 a sound which is set so as to correspond to the extracted information, and sends the selected sound as a reproduction signal to the transmission section 105.

[Step S25]

The transmission section 105 transmits the display signal and reproduction signal extracted at step S24 to the headset 12 by a short-distance wireless.

[Step S26]

The reception section 106 receives the display signal and reproduction signal transmitted at step S25 by a short-distance wireless.

[Step S27]

The reception section 106 reproduces the display signal received at step S26 through the small display 107. Furthermore, the reception section 106 sends the reproduction signal to the sound notifying section 202.

[Step S28]

The sound notifying section 202 reproduces the reproduction signal through the earphone 201.

[Step S29]

The manipulation section 103 receives from the user an instruction to display on the large display 108 the mail received and stored at step S23. If such an instruction is made within a predetermined time period, the process proceeds to step S2A. If not, the process returns to step S23.

[Step S2A]

Based on the instruction received at step S29, the control section 102 instructs the information reception section 101 to perform a display on the large display 108.

[Step S2B]

The information reception section 101 displays on the large display 108 a list of mails received and stored at step S23. When the list is displayed, the display can be changed to the content of a selected mail, and when the content of the selected mail is displayed, the display can be changed to the list, by a manipulation of the user. If a manipulation of the user is not made within a predetermined time period, the display on the large display 108 is deleted, and the process returns to step S23.

As described above, according to this embodiment, arrival of a mail and a portion of the content of the mail are displayed on the small display provided in front of an eye of the user, and in addition, arrival of the mail is notified to the user by a sound emitted through the earphone, whereby the user can surely be notified about arrival of the mail even when the user fails to notice the display on the small display.

(Embodiment 3)

In embodiment 2 described above, information is notified using a sound in addition to a display on a small display, whereas in embodiment 3, information is notified by a vibration in place of the sound.

Figure 10:
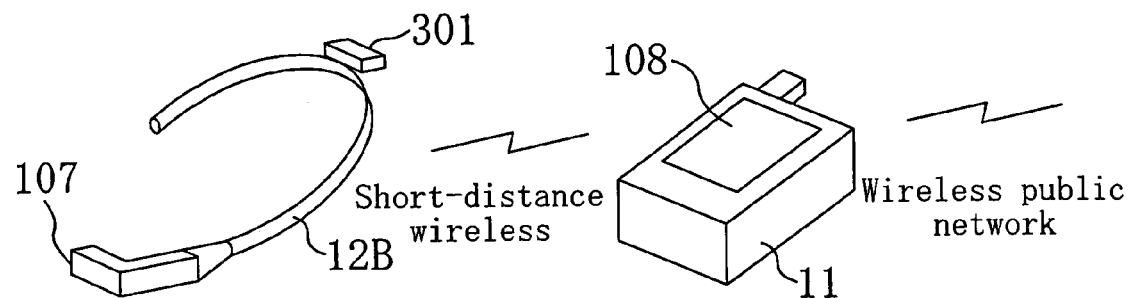
FIG. 10 shows an exterior of a wearable information notifying device according to embodiment 3 of the present invention.
Figure 11:
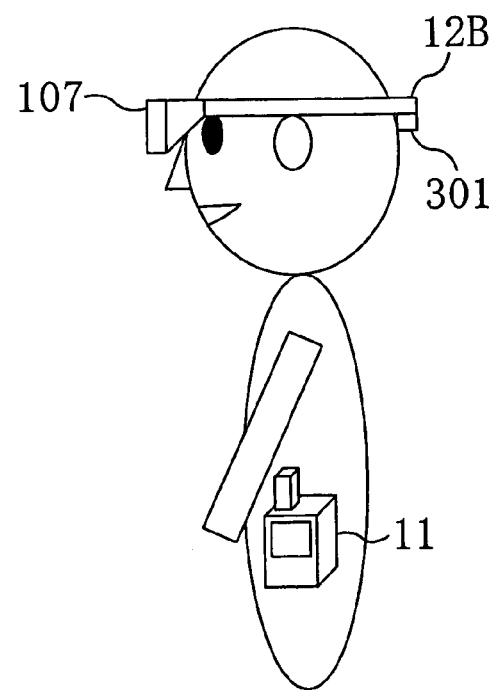
FIG. 11 shows a user who wears the wearable information notifying device of FIG. 10.
Figure 12:
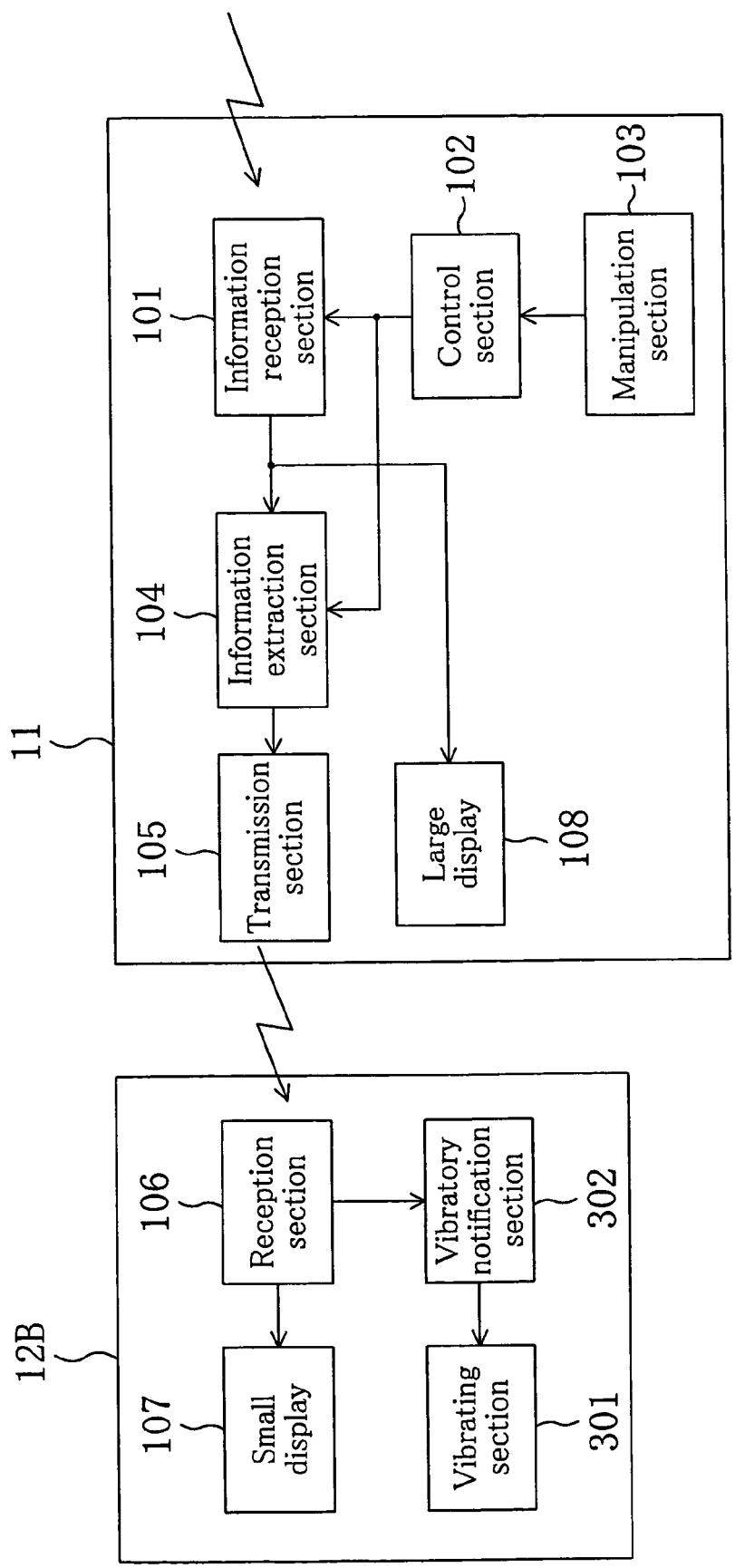
FIG. 12 is a functional block diagram of the wearable information notifying device of FIG. 10.

FIG. 10 shows an exterior of a wearable information notifying device according to this embodiment. FIG. 11 shows a user who wears the wearable information notifying device of FIG. 10. FIG. 12 is a functional block diagram of the wearable information notifying device of FIG. 10. In FIGS. 10 through 12, like elements are denoted by like reference numerals used in FIGS. 1 through 3 of embodiment 1, and therefore, detailed descriptions thereof are herein omitted. Embodiment 3 is different from embodiment 1 in that a headset 12B includes a vibrating section 301 for providing a vibration to the head and a vibratory notification section 302 for driving the vibrating section 301 according to a vibration signal based on information output from the information extraction section 104.

Figure 13:
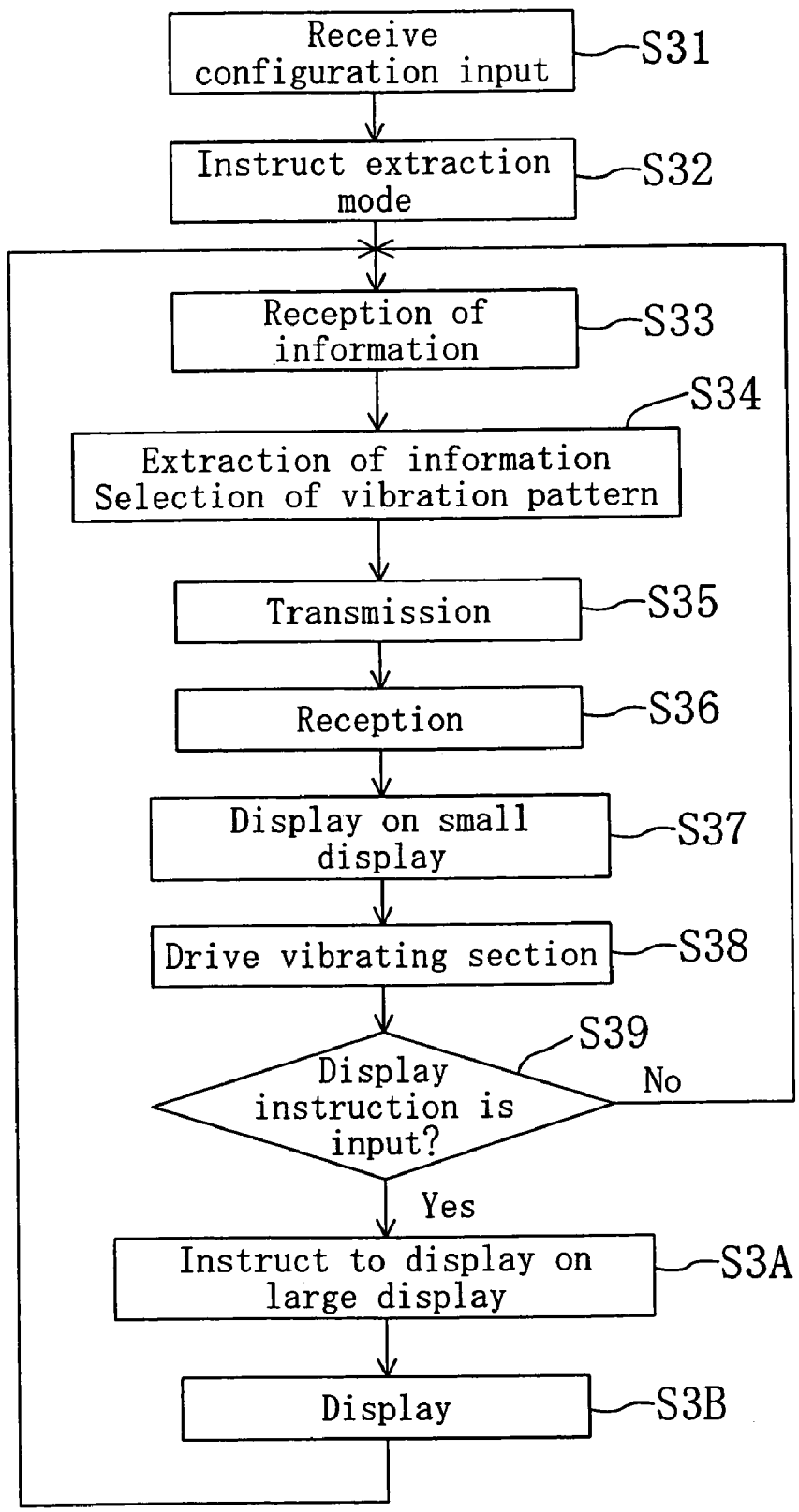
FIG. 13 is a flowchart showing an operation of the wearable information notifying device of FIG. 10.

An operation of the wearable information notifying device according to this embodiment which has the above-described structure is described with reference to the flowchart of FIG. 13. Here also, we consider a case where the information reception section 101 is connected to a wireless public network and receives an electronic mail as externally supplied information, as described in embodiment 1.

[Step S31]

The manipulation section 103 receives from a user a configuration input concerning particulars to be displayed on the small display 107 and a vibration control pattern used at the vibrating section 301. The particulars which can be input by the user include: selection of the mail attribute to be displayed ("sender", "title", "degree of importance", "keyword"); the condition for an attribute value of the mail attribute to be displayed; the correspondence between the attribute value of the mail attribute and the character color or background color; and the on/off of a flashing operation in the display; and additionally, the correspondence between the attribute value of the mail attribute and the vibration pattern. For example, the user can determine the configuration such that: the "keyword" is displayed as the mail attribute; characters are displayed in "red" if the "keyword" includes "C"; the display is carried out according to the "flashing operation"; and a vibration is made according to "vibration pattern J".

[Step S32]

Based on the input at step S31, the control section 102 instructs the information reception section 101 to start receiving information and instructs the information extraction section 104 about the mode for extracting information.

[Step S33]

The information reception section 101 communicates with an external mail server (not shown) through the wireless public network at a predetermined time interval to receive a newly-arrived electronic mail. Then, the information reception section 101 stores the received electronic mail and sends it to the information extraction section 104.

[Step S34]

Based on the input at step S31, the information extraction section 104 extracts the sender, title, degree of importance, or keyword, from the information received by the information reception section 101, and sends to the transmission section 105 a display signal including the extracted information and the display attributes concerning the display color and flashing operation. Furthermore, the information extraction section 104 selects from among a plurality of vibration patterns previously stored in the main component 11 a vibration pattern which is set so as to correspond to the extracted information, and sends the selected vibration pattern as a vibration signal to the transmission section 105.

[Step S35]

The transmission section 105 transmits the display signal and vibration signal extracted at step S34 to the headset 12 by a short-distance wireless.

[Step S36]

The reception section 106 receives the display signal and vibration signal transmitted at step S35 by a short-distance wireless.

[Step S37]

The reception section 106 reproduces the display signal received at step S36 through the small display 107. Furthermore, the reception section 106 sends the vibration signal to the vibratory notification section 302.

[Step S38]

The vibratory notification section 302 drives the vibrating section 301 to vibrate according to the vibration signal.

[Step S39]

The manipulation section 103 receives from the user an instruction to display on the large display 108 the mail received and stored at step S33. If such an instruction is made within a predetermined time period, the process proceeds to step S3A. If not, the process returns to step S33.

[Step S3A]

Based on the instruction received at step S39, the control section 102 instructs the information reception section 101 to perform a display on the large display 108.

[Step S3B]

The information reception section 101 displays on the large display 108 a list of mails received and stored at step S33. When the list is displayed, the display can be changed to the content of a selected mail, and when the content of the selected mail is displayed, the display can be changed to the list, by a manipulation of the user. If a manipulation of the user is not made within a predetermined time period, the display on the large display 108 is deleted, and the process returns to step S33.

As described above, according to this embodiment, arrival of a mail and a portion of the content of the mail are displayed on the small display provided in front of an eye of the user, and in addition, arrival of the mail is notified to the user by a vibration given to the head of the user, whereby the user can surely be notified about arrival of the mail even in a situation where confirmation by a sound is difficult.

In embodiments 1–3, reception of information is achieved through the wireless public network. However, according to the present invention reception of information may be achieved through a fixed public network, a television broadcast, a radio broadcast, or other methods. Further, a mail is received as information in embodiments 1–3, but according to the present invention, other information, such as a news program, a program table, etc., may be received. Furthermore, a communication between the main component and the headset is established by a short-distance wireless in embodiments 1–3, but according to the present invention, the communication may be established through other communication means, such as a wired communication, an infrared communication, etc. Further still, the information extraction section is provided at the main component in embodiments 1–3, but according to the present invention, the information extraction section may be provided at the headset.

(Embodiment 4)

In embodiments 1–3 described above, information to be notified is externally-supplied information. However, in embodiment 4, information stored in a medium which is inserted in a main component of the information notifying device can be notified.

Figure 14:
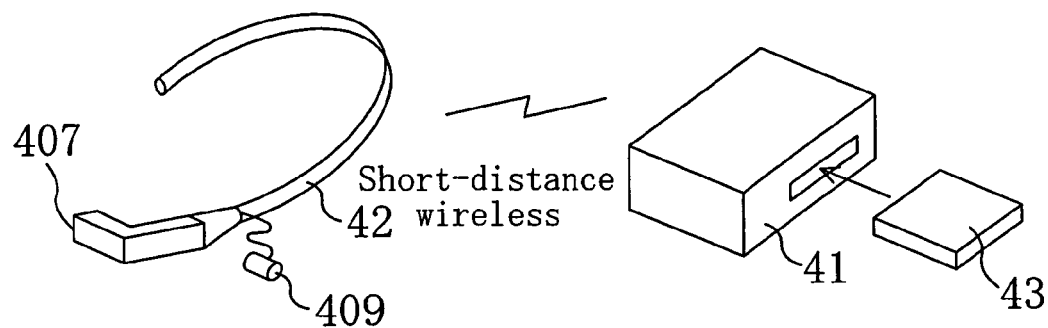
FIG. 14 shows an exterior of a wearable information notifying device according to embodiment 4 of the present invention.

FIG. 14 shows an exterior of a wearable information notifying device according to this embodiment. In FIG. 14, reference numeral 41 denotes a main component which reads information from a recording medium 43, such as a DVD, or the like. Reference numeral 42 denotes a headset which is to be worn by a user. The headset 42 has the same appearance as that of the headset 12A shown in FIG. 6, i.e., has a shape such that it is attached substantially horizontally at the head of the user by a flexible headband (Katyusha). The headset 42 has a small display 407 at one end of the headband. Further, the headset 42 has an earphone 409 which is to be put in the ear of the user.

Figure 15:
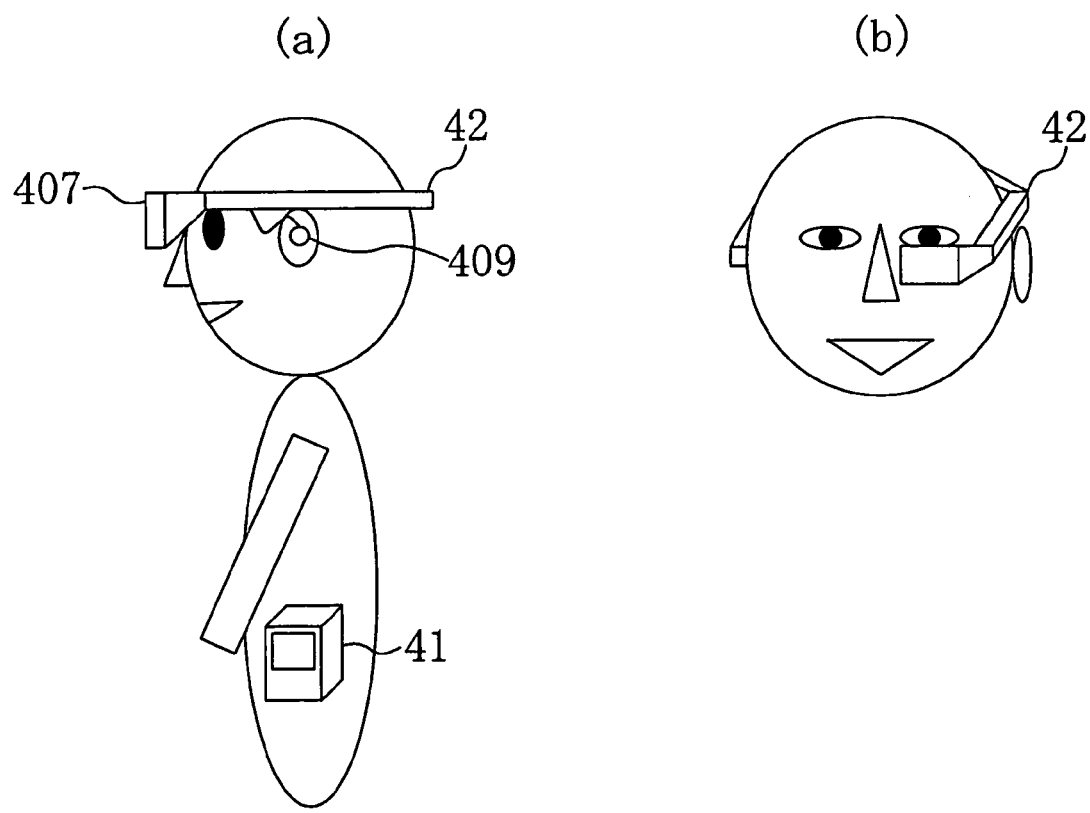
FIG. 15 shows a user who wears the wearable information notifying device of FIG. 14.

FIG. 15 shows the wearable information notifying device of FIG. 14 which is worn by a user. When the user wears the headset 42, the small display 407 is placed in front of an eye of the wearer so as to be within the view field of the wearer. The main component 41 is held at a belt, in a pocket, or the like, of the user.

Figure 16:
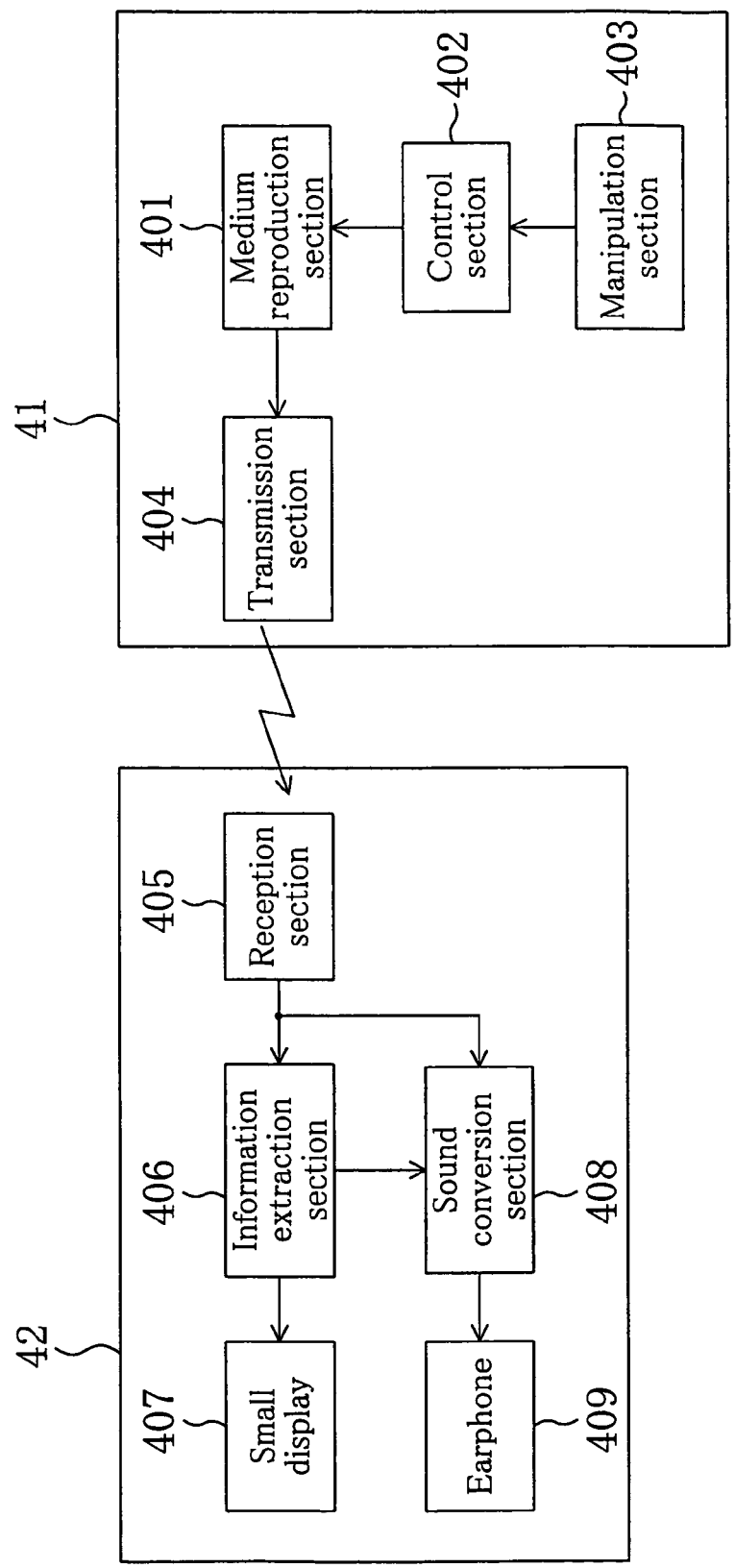
FIG. 16 is a functional block diagram of the wearable information notifying device of FIG. 14.

FIG. 16 is a functional block diagram of the wearable information notifying device of FIG. 14. In FIG. 16, reference numeral 401 denotes a medium reproduction section for reproducing information stored in the medium 43; reference numeral 402 denotes a control section for controlling the medium reproduction section 401; reference numeral 403 denotes a manipulation section which receives a manipulation for the control section 402 from a user; reference numeral 404 denotes a transmission section for transmitting information reproduced by the medium reproduction section 401 to the headset 42; reference numeral 405 denotes a reception section for receiving information from the main component 41; reference numeral 406 denotes an information extraction section for extracting a portion of the information received by the reception section 405 for display on the small display 407; and reference numeral 408 denotes a sound conversion section for converting the information received by the reception section 405 to a sound.

Figure 17:
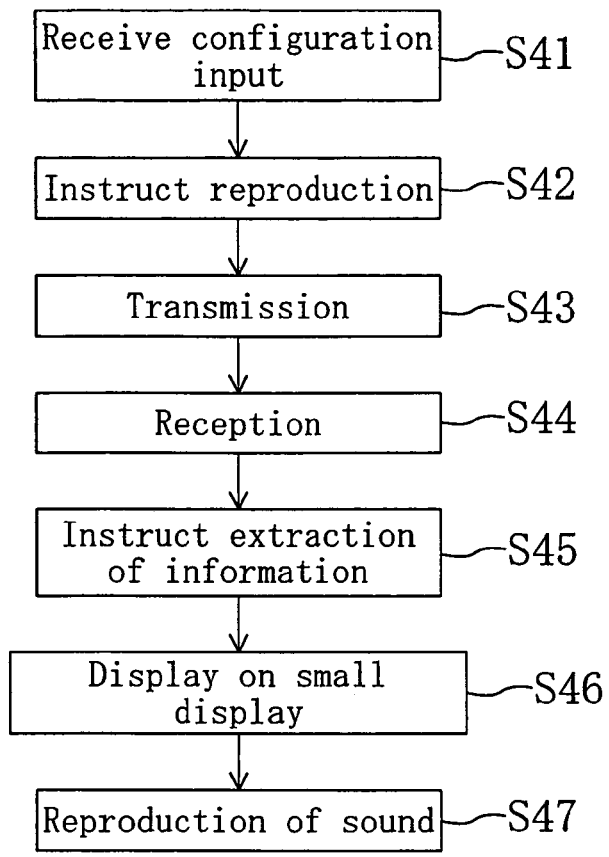
FIG. 17 is a flowchart showing an operation of the wearable information notifying device of FIG. 14.

An operation of the wearable information notifying device according to this embodiment which has the above-described structure is described with reference to the flowchart of FIG. 17. Here, we consider a case where the medium reproduction section 401 reproduces music and song data recorded on a SD (Secure Disk), or the like.

[Step S41]

The manipulation section 403 receives from a user a configuration input concerning particulars to be displayed on the small display 407. The particulars which can be input by the user include selection of whether or not to display each of the song attributes ("track number", "artist name", "song name", "lyrics"). The manipulation section 403 receives a control manipulation, such as start/stop of reproduction, etc., from the user.

[Step S42]

The control section 402 instructs the medium reproduction section 401 to 20 start reproduction based on the input made at step S41.

[Step S43]

The transmission section 404 transmits the information reproduced at step S42 to the headset 42 by a short-distance wireless.

[Step S44]

The reception section 405 receives the information transmitted at step S43 through the short-distance wireless.

[Step S45]

The reception section 405 sends the information received at step S44 to the information extraction section 406 and the sound conversion section 408.

[Step S46]

Figure 18:
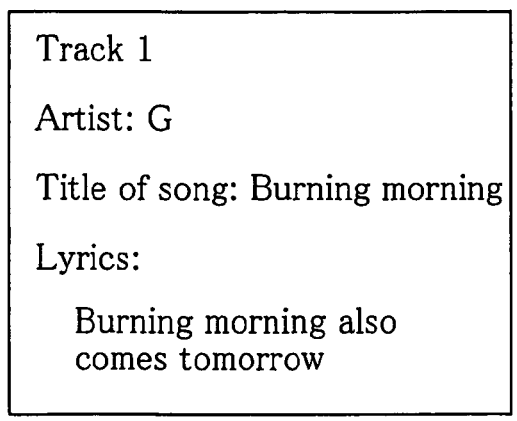
FIG. 18 is a display example which is obtained in embodiment 4.

The information extraction section 406 extracts from the information received at step S44 a piece of information to be displayed, and displays the extracted information on the small display 407. FIG. 18 is a display example shown on the small display 407.

[Step S47]

The sound conversion section 408 extracts sound information from the information received at step S44. The sound conversion section 408 then converts the extracted information to a sound signal and reproduces the sound signal through the earphone 409.

As described above, according to this embodiment, a portion of information stored in a medium is displayed on a small display provided in front of an eye of a user, whereby the user can easily confirm additional information which is provided when the user reproduces the medium.

In this embodiment, a communication between the main component and the headset is established by a short-distance wireless, but according to the present invention, the communication may be established through other communication means, such as wired communication means, infrared communication means, etc.

(Embodiment 5)

Figure 19:
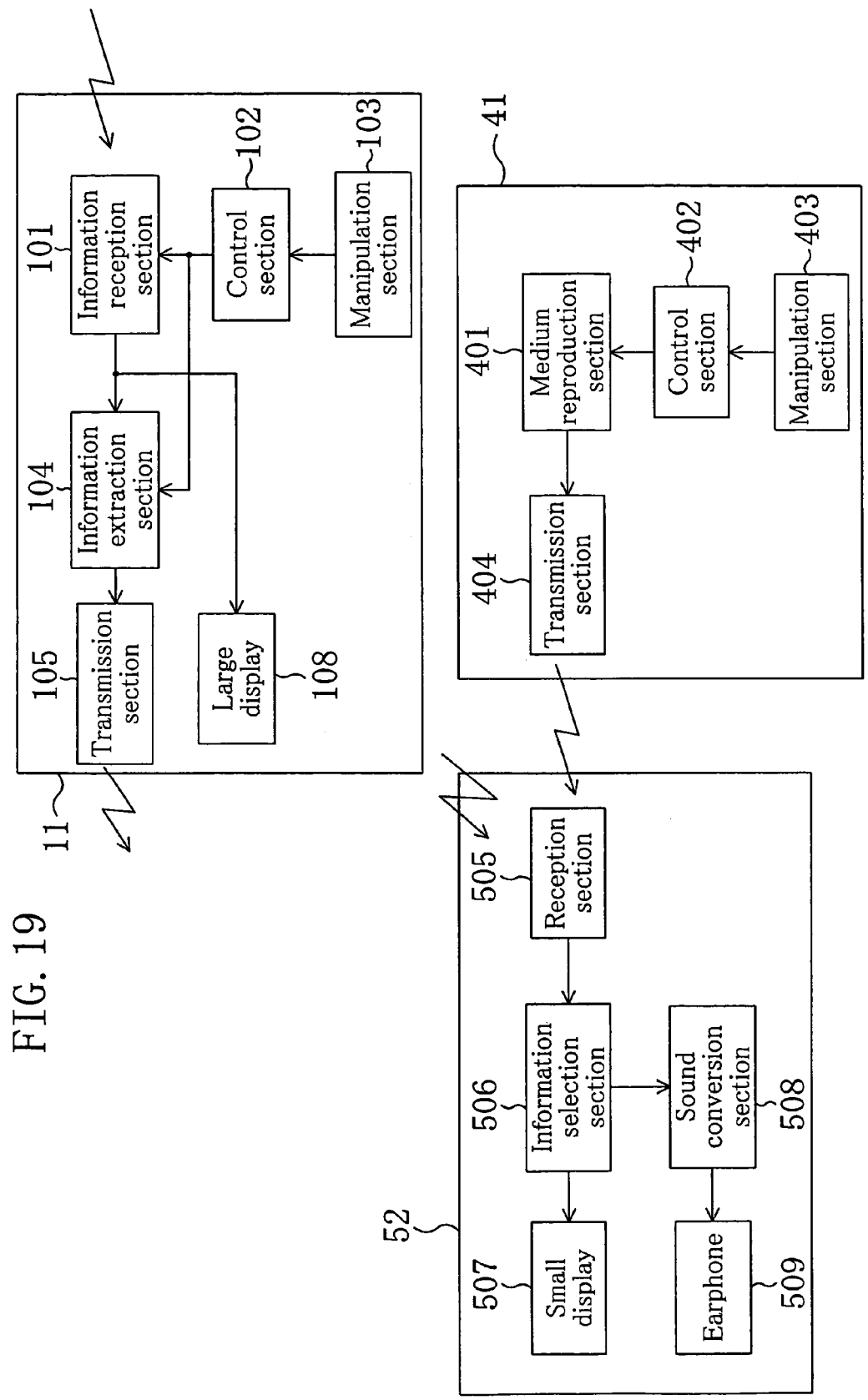
FIG. 19 is a functional block diagram of a wearable information notifying device according to embodiment 5 of the present invention.

In embodiment 5, information received from a plurality of devices are selectively displayed. FIG. 19 is a functional block diagram of a wearable information notifying device according this embodiment. In FIG. 19, like elements are denoted by like reference numerals used in FIGS. 3 and 16, and therefore, detailed descriptions thereof are herein omitted. In the headset 52, reference numeral 505 denotes a reception section for receiving information from the main components 11 and 41; reference numeral 506 denotes an information selection section for selecting from the information received by the reception section 505 a piece(s) of information to be displayed or reproduced; reference numeral 508 denotes a sound conversion section for converting the information received by the reception section 505 to a sound; reference numeral 507 denotes a small display for displaying information; and reference numeral 509 denotes a earphone 509 for reproducing the sound.

An operation of the wearable information notifying device according to this embodiment which has the above-described structure is described. Herein, details about the reproduction of music and the display of song information are the same as those described in embodiment 4. Further, herein assume that an emergency mail, or the like, is arrived at the information reception section 101 during reproduction of music. At this time, previously-set information is extracted from the arrived mail by the information extraction section 104, and the extracted information is received by the reception section 505 through the transmission section 105. In the case where reception of mails has priority over reproduction of music, the content of the mail received by the reception section 505 is selected by the information selection section 506, and the display of the small display is changed to the content of the mail from the song information. The subsequent part of the process is the same as that of embodiment 1, and therefore, descriptions thereof are omitted.

With the above arrangement, information received from a plurality of devices can be selectively displayed on the small display in an integrated fashion. A user can control a plurality of devices or check the status of the plurality of devices through a single display only by setting the priority of information.

In this embodiment, the communication between the main component and the headset is established by a short-distance wireless, but according to the present invention, the communication may be established through other communication means, such as wired communication means, infrared communication means, etc.

(Embodiment 6)

In the above-described embodiments, a small display is provided in front of an eye of a user. Therefore, if information is suddenly displayed on the small display, the user may be astonished at and upset about the sudden display. For example, there is a problem in safety if a notice of arrival of a mail, or the like, is suddenly displayed on the small display while the user wearing a headset is driving a car. Further, since the eyes of a user in a dimmed place, e.g., a public place, such as a movie theater, a museum, or the like, are adjusted to the dimness of his/her surroundings, it is difficult for the user to confirm information if the information is suddenly displayed with higher brightness on the small display provided in front of the eye of the user. Embodiment 6 of the present invention solves such problems.

Figure 20:
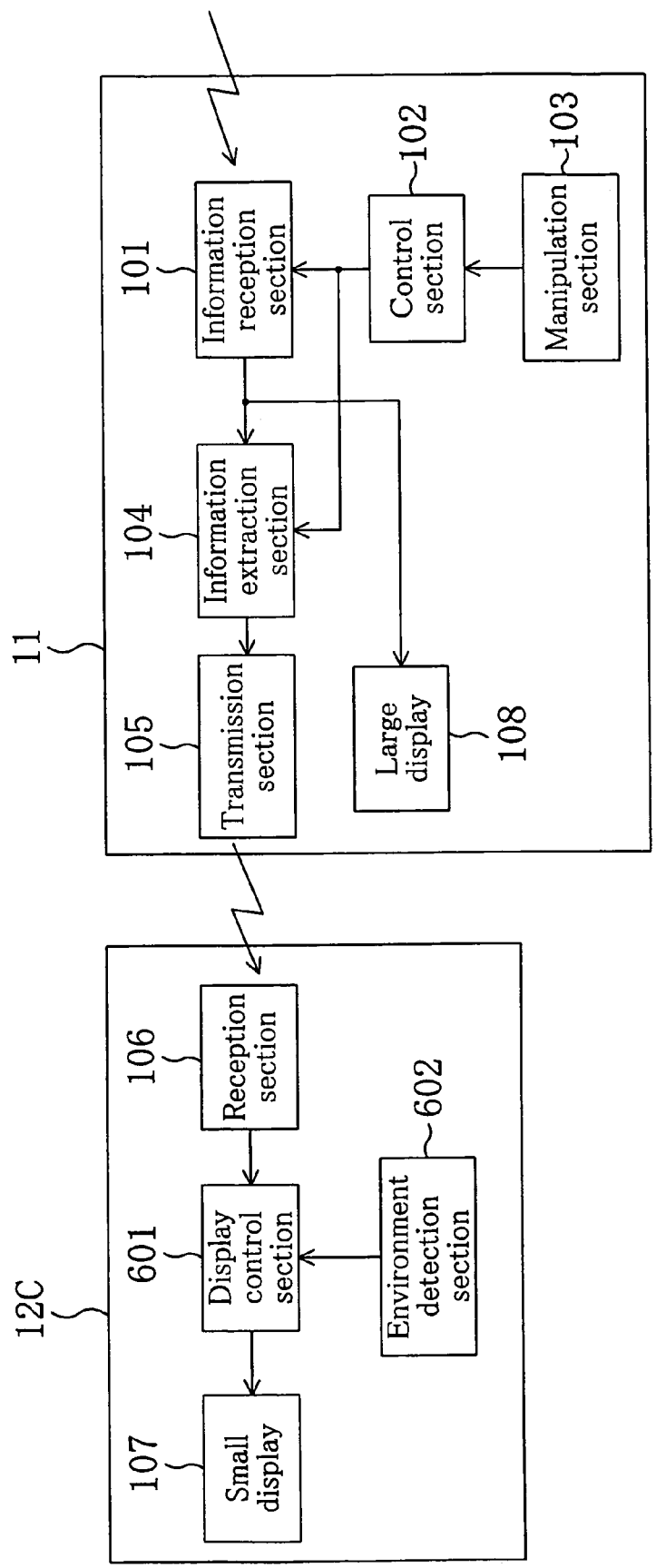
FIG. 20 is a functional block diagram of a wearable information notifying device according to embodiment 6 of the present invention.

FIG. 20 is a functional block diagram of a wearable information notifying device according this embodiment. In FIG. 20, like elements are denoted by like reference numerals used in FIG. 3, and therefore, detailed descriptions thereof are herein omitted. Embodiment 6 is different from embodiment 1 in that a headset 12C includes a display control section 601 for controlling the display mode of the small display 107 according to a given control signal, and an environment detection section 602 for detecting the state of the environment around the headset 12C to supply the control signal to the display control section 601 according to the detected environmental state.

Herein, assume that the environment detection section 602 detects the brightness of the surroundings of the headset 12C. The display control section 601 controls the brightness of the small display 107 according to the brightness detected by the environment detection section 602. For example, the display control section 601 previously stores the table shown in FIG. 21 and selects the display mode for the small display 107 according to the brightness of the surroundings which is detected by the environment detection section 602. The other part of the operation is the same as that of embodiment 1.

In the case where the surroundings are dim, information is displayed according to the dimness of the surroundings. On the other hand, in the case where the surroundings are bright, information is displayed according to the brightness of the surroundings. With such a structure, the user can confirm the information without imposing a burden on his/her eyes.

It should be noted that the environment detection section 602 may be provided in the main component 11.

Alternatively, the state of an environmental feature other than the brightness may be detected. For example, the noise of the surroundings may be detected by the environment detection section 602. In general, a user is unlikely to notice externally-supplied information when the external noise is large. Therefore, when the external noise is large, information is displayed with higher brightness as compared with normal display, or a presented display is blinked, in order to surely notify the user about the information.

Alternatively, in the case where a large number of words uttered by a user are detected by the environment detection section 602, it may be determined that the user is engaged in a conversation with somebody, and the timing of providing information may be delayed. With such an arrangement, information can be presented on the small display without inhibiting a communication of the user with somebody else.

Alternatively, a vibration may be detected by the environment detection section 602 using a gyro, or the like. In the case where it is determined from the pattern of the detected vibration that a user is walking or running, the timing of providing information may be delayed.

Figure 22:
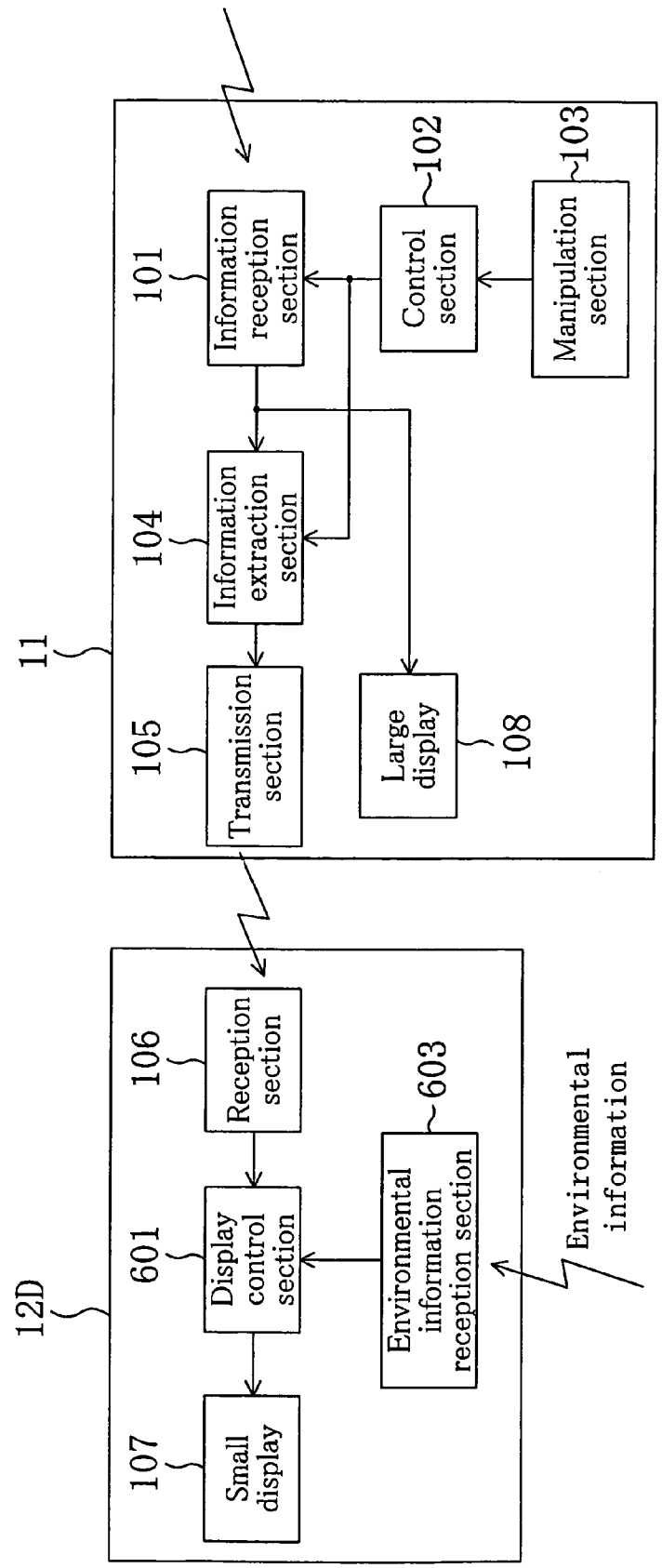
FIG. 22 is a functional block diagram of another example of the wearable information notifying device according to embodiment 6 of the present invention.

In the structure shown in FIG. 20, the environment detection section 602 is provided in the headset. Instead, environmental information detected by environment detection means which is provided outside the wearable information notifying device may be received by wireless or wired network, and the display mode of the small display 107 may be controlled according to the received environmental information. FIG. 22 shows such a structure wherein an environmental information reception section 603, which receives environmental information from outside and provides a control signal to the display control section 601 according to the received environmental information, is provided in place of the environment detection section 602 of FIG. 20.

Here, we consider a case where a user is driving a car, and the environmental information reception section 603 receives the current velocity of the car as the environmental information from a sensor of the car. Further, at step S17 of embodiment 1, the display control section 601 does not activate the small display 107 while the car is moving, but activates the small display 107 when the velocity of the car is decreased to zero or a sufficiently slow speed. With such an arrangement, the small display 107 is activated only when the velocity of the car is decreased and sufficient safety is secured. Thus, there is no problem in safety.

Further, not only the velocity of the car but also activation of a side brake or stoppage of an engine may be detected, and information may be displayed at such a timing.

Furthermore, by using information obtained from a GPS, or the like, or information obtained from a gyro, information to be displayed on the small display may be restricted, for example, when a user is moving (driving or walking).

Figure 23:
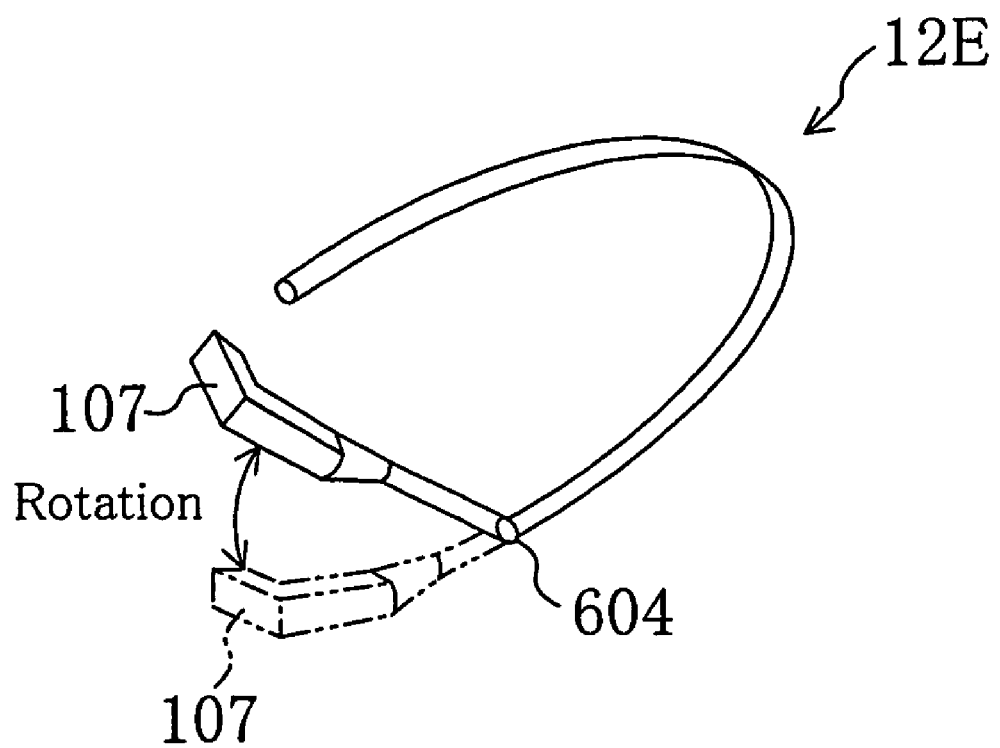
FIG. 23 shows an exterior of a headset which has a driving mechanism.

Furthermore, as shown in FIG. 23, a driving mechanism 604, such as a small motor, may be provided for shifting the small display 107 between a position in front of an eye of a wearer and a position not in front of the eye of the wearer. With such a mechanism, for example, the small display 107 is provided in front of the eye only when there is information necessary for the user, but is removed out of the view field of the user when not so as not to block the view field of the user during his/her everyday life activity.

Figure 24:
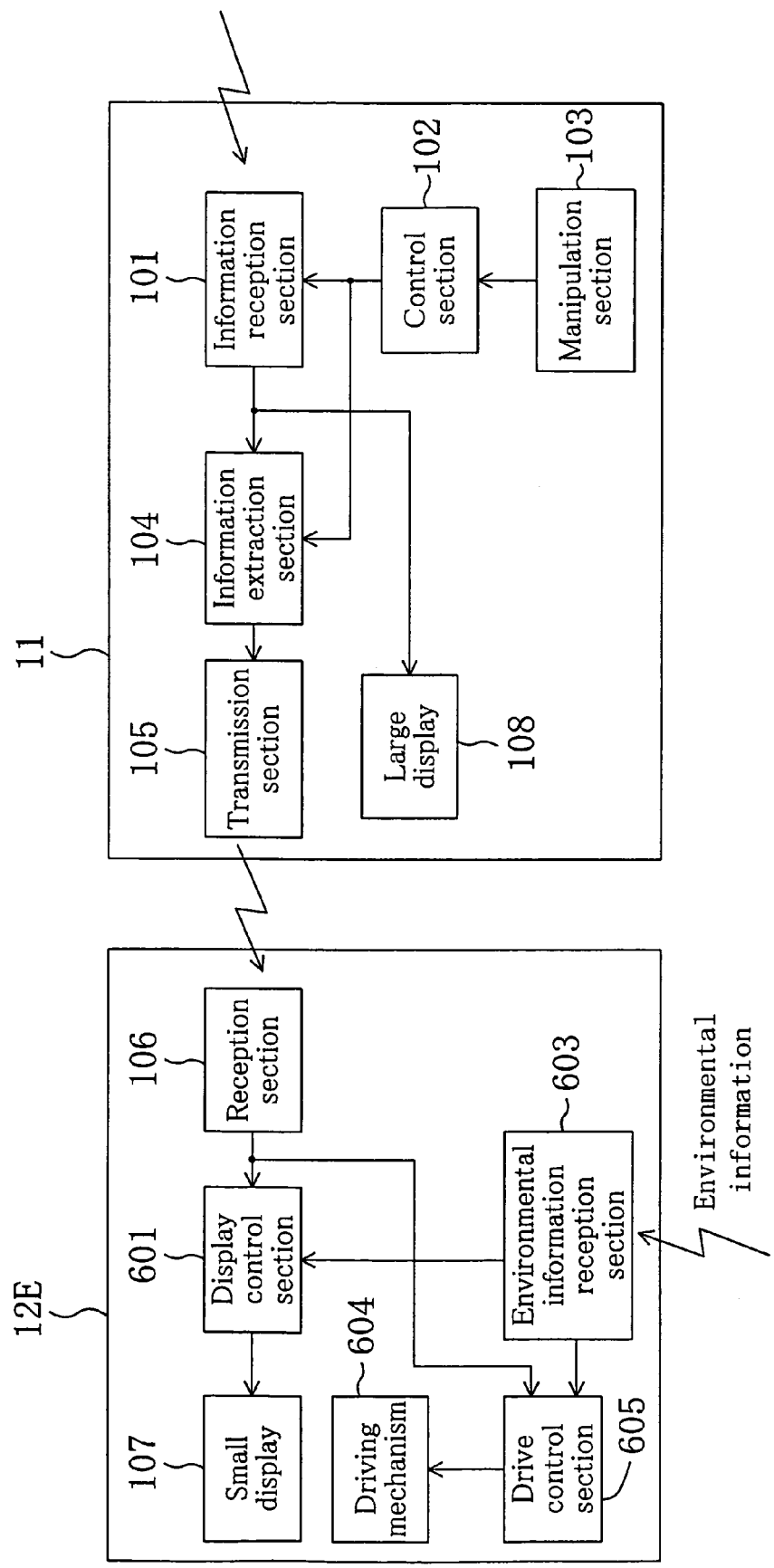
FIG. 24 is a functional block diagram of a wearable information notifying device which includes the headset of FIG. 23.

FIG. 24 is a functional block diagram of a wearable information notifying device used in this example. According to the structure of FIG. 24, the headset 12E includes a drive control section 605 for controlling the operation of the driving mechanism 604 according to information output from the information extraction section 104 and received by the reception section 106. Further, the drive control section 605 controls the operation of the driving mechanism 604 while additionally considering the environmental information received by the environmental information reception section 603.

Specifically, only when information necessary for the user is received and sufficient safety is secured even with provision of information to the user, the drive control section 605 drives the driving mechanism 604 to provide the small display 107 in front of the eye of the user. That is, when the user is driving a car, or the like, and there is not any particular information necessary for the user, the small display 107 is moved away from the position in front of the eye of the user such that the view field of the user is not blocked. Only when information necessary for the user is received, and sufficient safety is secured even with provision of information to the user (e.g., when the car is stopped), the small display 107 is provided in front of the eye of the user to present the information to the user.

That is, the headset having the small display described herein includes: the driving mechanism capable of shifting the small display between the position in front of the eye of the wearer and the position not in front of the eye of the wearer; the reception section for receiving information from outside and outputting the received information to the small display; and a drive control section for controlling the operation of the driving mechanism based on the information received by the reception section.

For example, whether or not the received information is necessary for the user may be determined as described below. A keyword related to an interest of the user, e.g., "professional baseball", is previously registered in the drive control section 605. The driving mechanism 604 is set to operate when information related to the keyword "professional baseball" is received. With such an arrangement, the driving mechanism 604 is not activated when information related to a genre other than the "professional baseball", e.g., economy news, soccer, etc., is received, and the information is not presented to the user.

Figure 25:
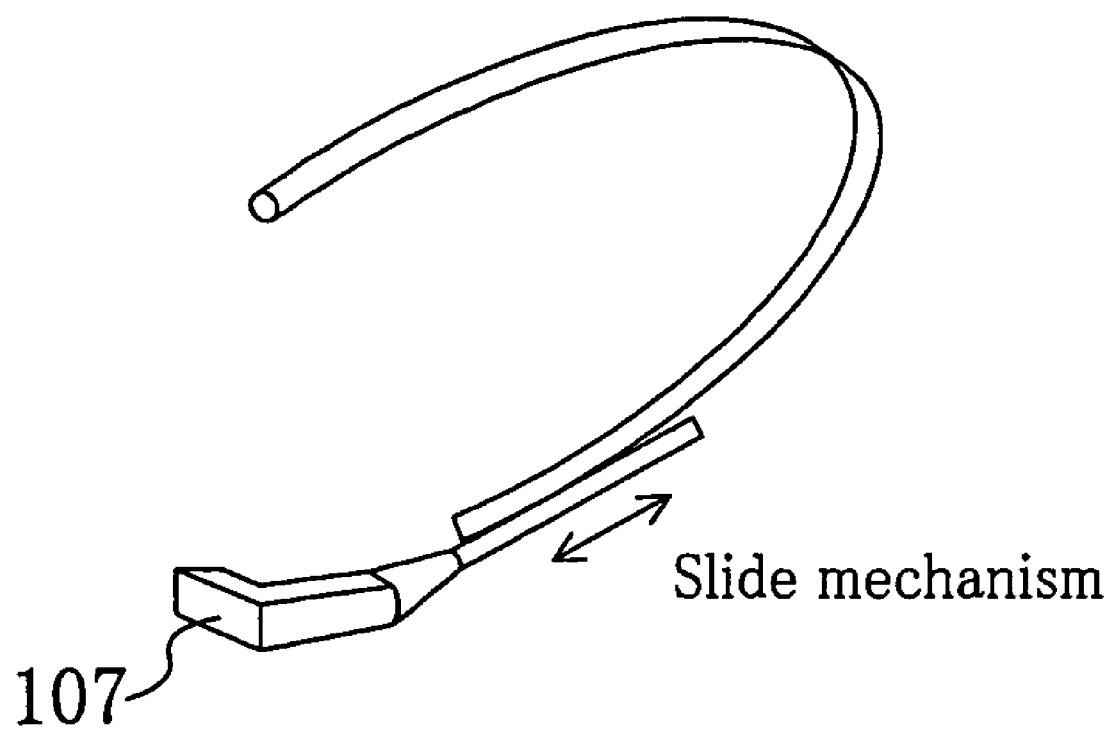
FIG. 25 shows an exterior of a headset which has a slide mechanism.

Further still, as shown in FIG. 25, the headset may be designed such that the small display 107 is slidable back and forth. With such a design, the headset may be adjusted for users having different head sizes.

(Embodiment 7)

In embodiments 1–3 described above, when a mail from outside is arrived, a portion of information contained in the mail is displayed on a small display. However, the information to be displayed on the small display may be a content of a TV broadcast, such as news, or the like. In this case, there is a possibility that if the user concentrates too much on watching the content, understanding by the user of the state of his/her surroundings is delayed. For example, in the case where the user is watching a content displayed on the small display provided in front of the eye during his/her movement by a transportation service, such as train, bus, or the like, there is a possibility that the user may too much concentrate on the content to miss the station or bus stop of his/her destination. This embodiment was conceived in order to solve such a problem.

Figure 26:
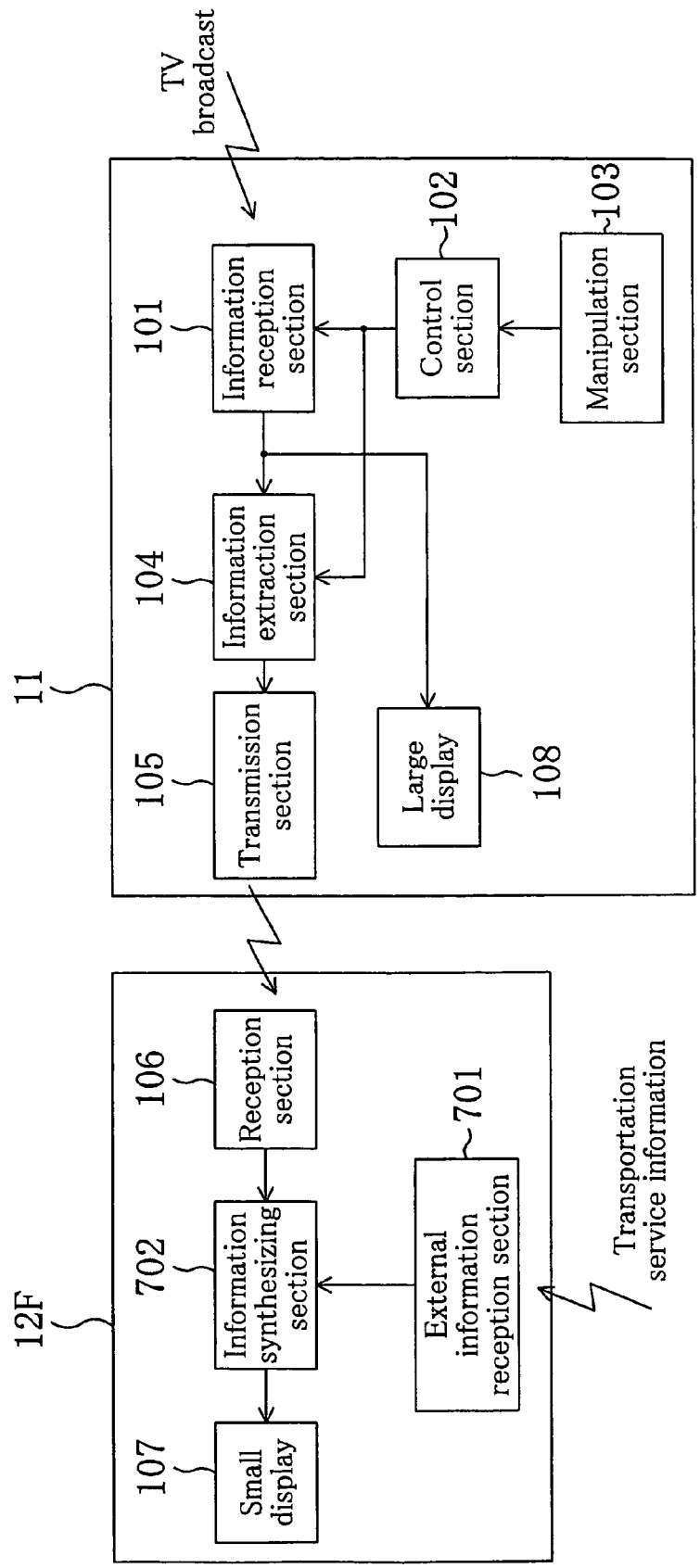
FIG. 26 is a functional block diagram showing a structure of a wearable information notifying device according to embodiment 7 of the present invention.

FIG. 26 is a functional block diagram showing a structure of a wearable information notifying device according to this embodiment. In FIG. 26, a headset 12F includes an external information reception section 701, which is employed as a second information reception section, and an information synthesizing section 702. The information synthesizing section 702 displays on the small display 107 first information, e.g., a TV broadcast program, which is received by the information reception section 101 employed as the first information reception section of the main component 11. Further, when second information concerning the service status of the transportation service that the wearer currently uses, such as bus, train, or the like, is received by the external information reception section 701, the information synthesizing section 702 synthesizes the second information with the first information and displays the synthesized information on the small display 107.

Figure 27:
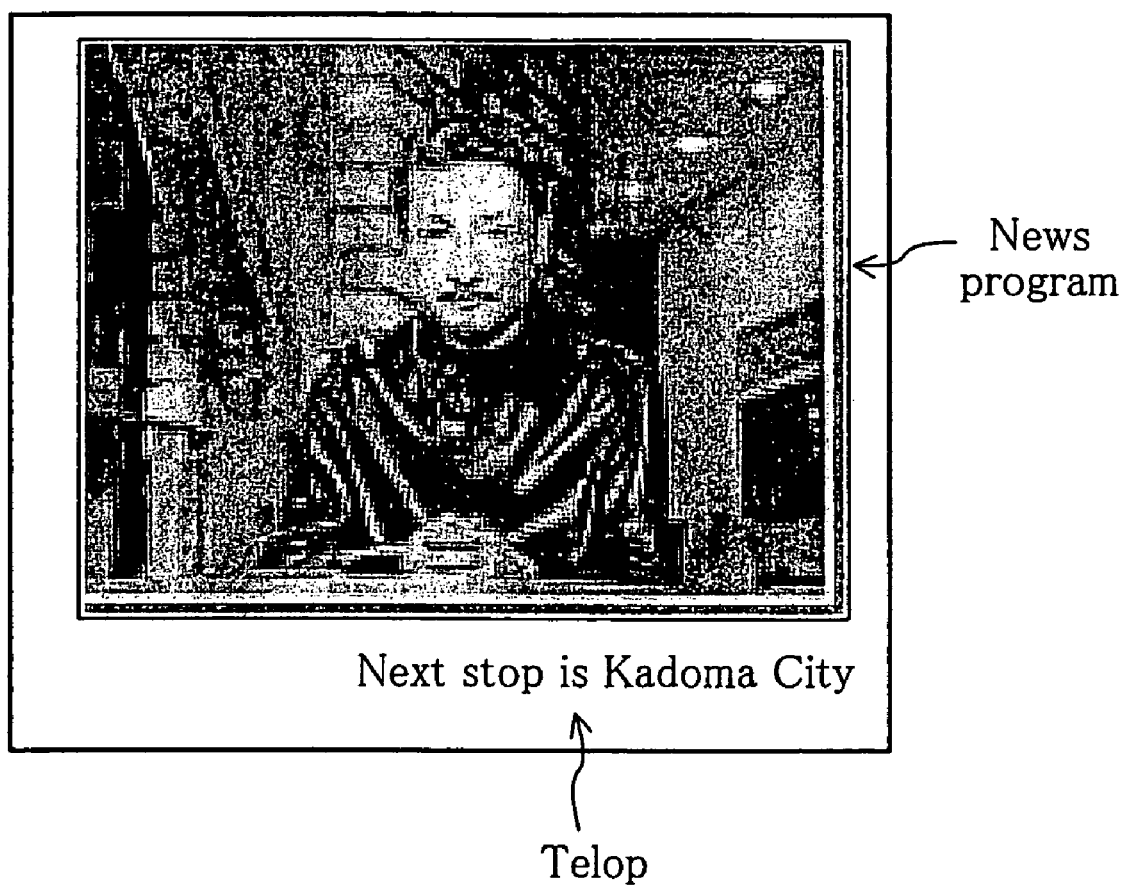
FIG. 27 is a display example of a small display in the wearable information notifying device of FIG. 26.

For example, as shown in FIG. 27, when information about arrival at a train station is obtained by the external information reception section 701 while a news program is displayed, the information is synthesized for display using a telop, or the like. With such an arrangement, even when the user concentrates too much on the information displayed on the small display 107 so that he/she misses hearing an in-train announcement, the user can confirm the content of the announcement through the small display 107.

Figure 28:
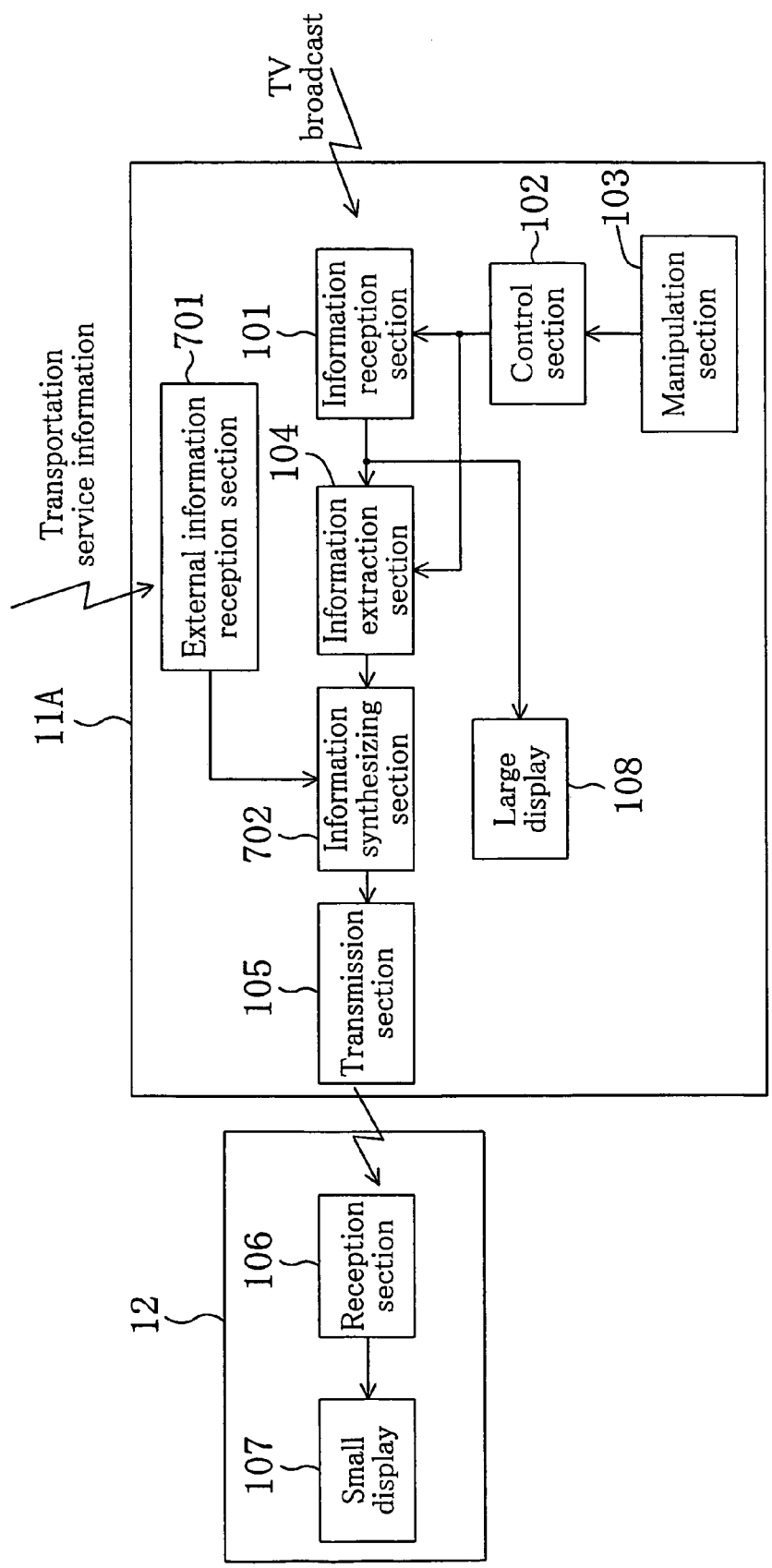
FIG. 28 is a functional block diagram of another example of the wearable information notifying device according to embodiment 7 of the present invention.

Further, as shown in FIG. 28, the external information reception section 701 and the information synthesizing section 702 may be provided in a main component 11A.

That is, the wearable information notifying device described herein includes: a headset having a small display which can be provided in front of an eye of a wearer, a first information reception section which communicates with an external device to receive first information; a second information reception section which communicates with an external device to receive second information; and an information synthesizing section which displays the first information on the small display and which synthesizes the second information with the first information to display the synthesized information on the small display when the second information is received by the second information reception section.

It is preferable that the first information is a TV broadcast program, and the second information is information concerning the service status of the transportation service that the wearer utilizes.

(Embodiment 8)

In FIGS. 1 and 2, the small display 107 is fixed in front of an eye of a user with a supporting bar which is looped around the back of the head. However, the means for fixing the small display is not limited to this.

Figure 29:
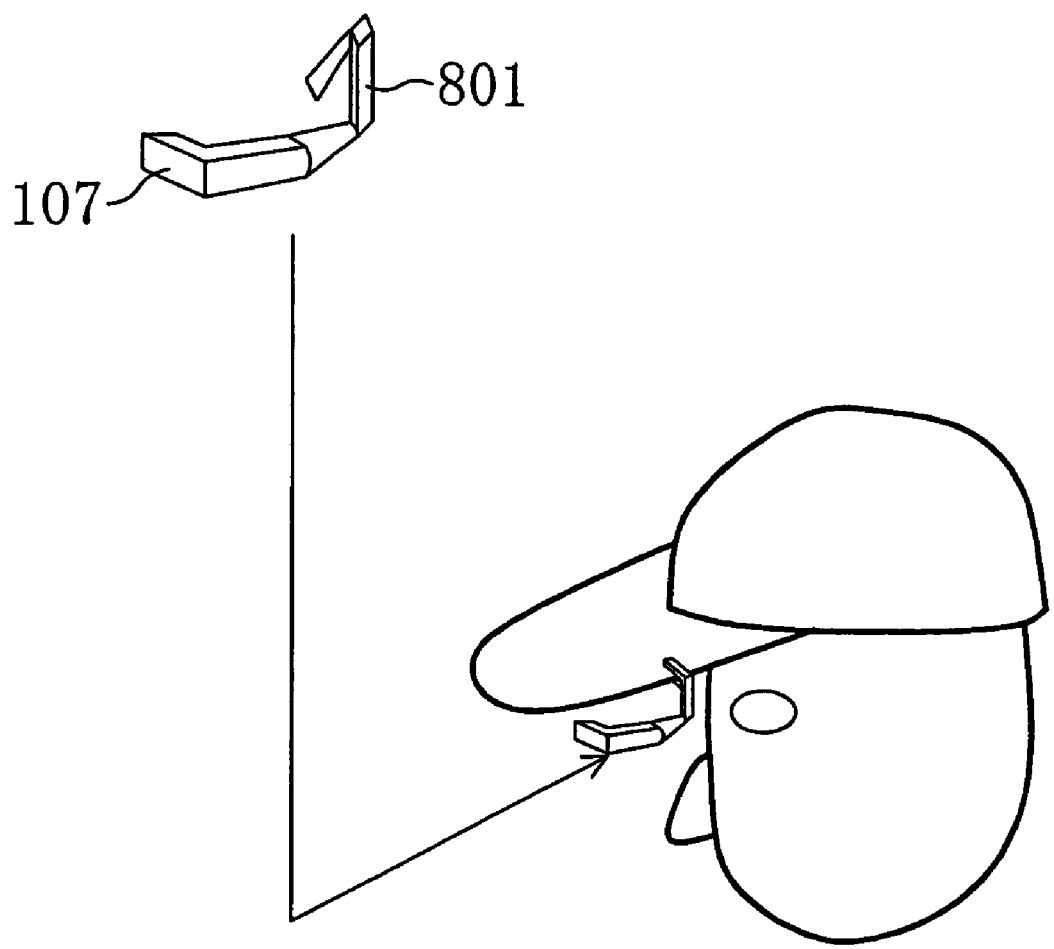
FIG. 29 shows an exterior of a small display according to embodiment 8 of the present invention, to which fixing means is attached.

FIG. 29 shows an arrangement where clip-like fixing means 801 is attached to the small display 107. With the fixing means 801, the small display 107 can be provided at a position where a user can easily view the small display 107 according to the place or situation where the user is in. For example, when the user is out of the door, the small display 107 can be attached to the brim of a cap, or the like. In one possible example, the user watches a game of an outdoor sport, such as a baseball game, but all the information provided to the main component of the communication device is not shown on the small display 107. For example, the user previously selects the team he/she likes. According to this setting, information for batters is displayed on the small display 107 when the selected team plays offense, and information for the pitcher and field players is displayed on the small display 107 when the selected team plays defense.

In the case where the small display 107 is fixed using a horizontal supporting bar around the head as shown in FIGS. 1 and 2, information can be confirmed by any one of the eyes. However, after intently watching the information provided on the small display 107, the one eye may be fatigued. Further, when the face of the user moves in a vertical direction, the small display 107 accordingly swings in a vertical direction so that it becomes difficult for the user to confirm the information.

Figure 30:
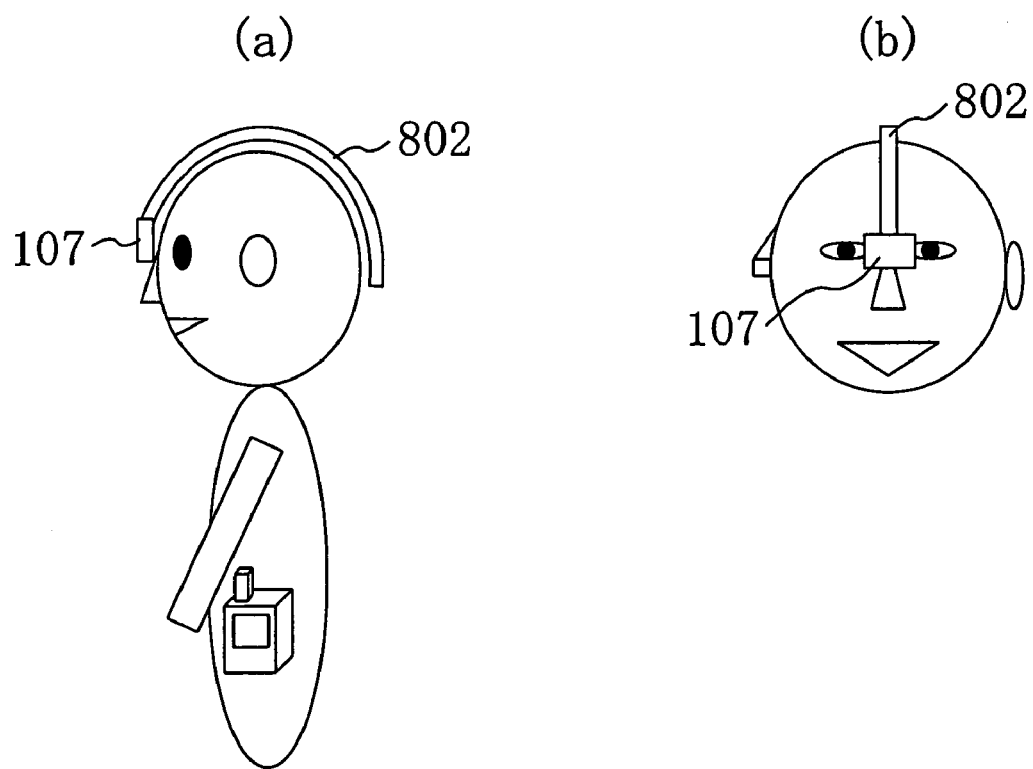
FIG. 30 shows an exterior of a headset according to embodiment 8 of the present invention, which uses a vertical supporting bar.

In order to eliminate such a problem, the small display 107 is fixed using a vertical supporting bar 802 provided over the head as shown in FIG. 30. With such an arrangement, information provided on the small display 107 can be confirmed by both of the eyes. Further, an undesirable swing of the small display 107, which can be caused by a vertical movement of the head, is reduced.

(Embodiment 9)

Figure 31:
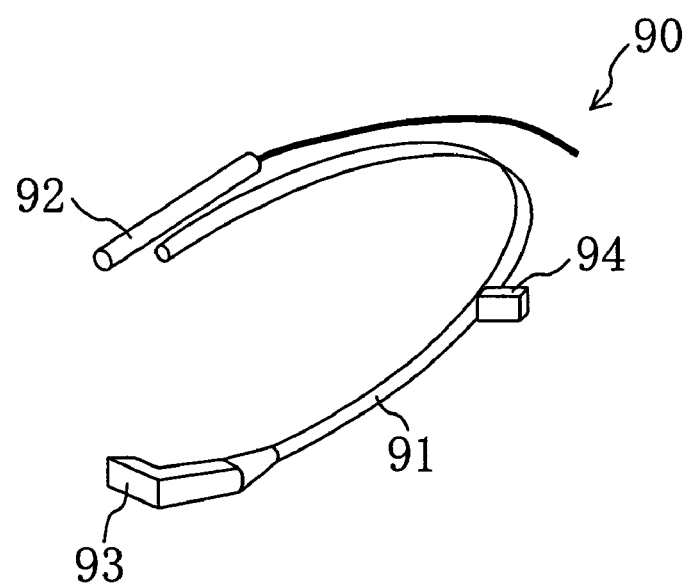
FIG. 31 shows an exterior of a headset according to embodiment 9 of the present invention.
Figure 32:
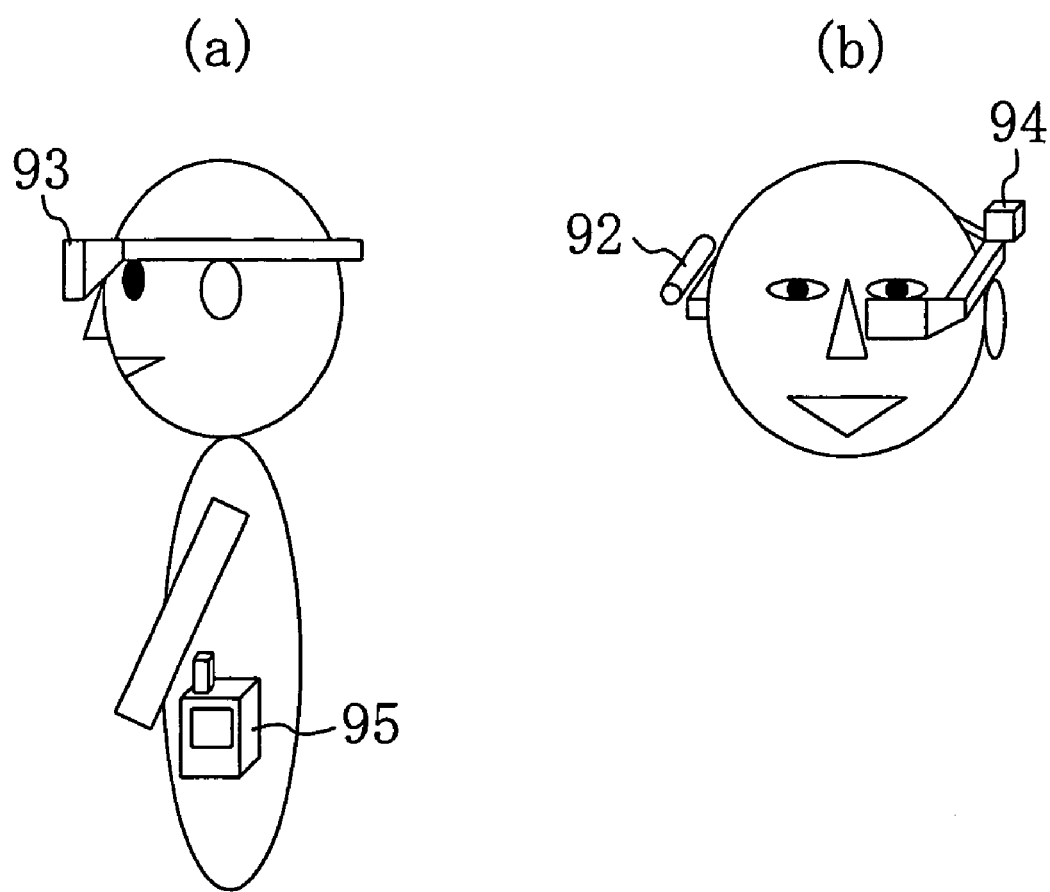
FIG. 32 shows a user who wears a wearable information notifying device including the headset of FIG. 31.

FIG. 31 shows an exterior of a headset according to embodiment 9 of the present invention. FIG. 32 shows a user who wears a wearable information notifying device including the headset of FIG. 31. The headset 90 shown in FIG. 31 includes: a headband(Katyusha)-shape base member 91 which can be fixed around the head of a human such that it is looped around the back of the head from one side portion to the other side portion of the head; a camera 92 which is provided at one end of the base member 91; and a small display 93 which is provided at the other end of the base member 91. When the user wears the headset 90 by fixing the base member 91 to his/her head, the camera 92 can capture an image from an area in front of the user, and the small display 93 is provided in front of an eye of the user. Reference numeral 95 denotes a main component which communicates with an external device to receive information.

Further, the headset 90 of FIG. 31 is designed for use with both of the eyes. That is, the small display 93 is provided in front of the left eye if the headset 90 shown in FIG. 31 is worn as it is, but the small display 93 is provided in front of the right eye if the headset 90 shown in FIG. 31 is worn upside down. Furthermore, the headset 90 includes an upside/downside detection section 94, such as a gyro or mercury switch, for detecting the upside/downside of the headset 90. It is possible to determine the upside/downside of an image shown on the small display 93 from a detection result of the upside/downside detection section 94. Thus, the user can wear the headset 90 without especially considering the left side/right side of the headset 90.

Figure 33:
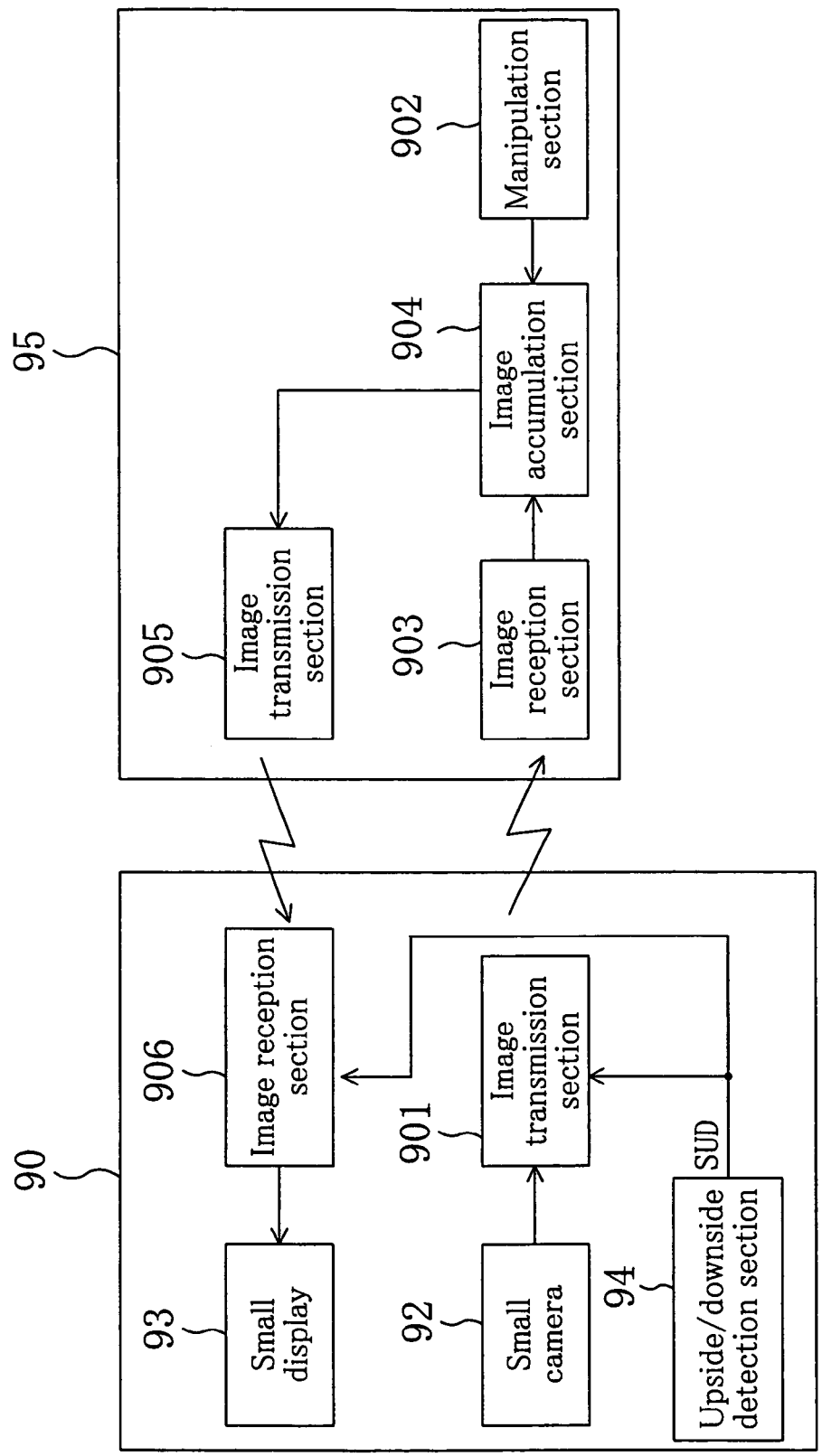
FIG. 33 is a functional block diagram of a wearable information notifying device including the headset of FIG. 31.

FIG. 33 is a functional block diagram of a wearable information notifying device according to this embodiment. In FIG. 33, the small camera 92 provided to the headset 90 captures image information from an area at which a user is looking. The upside/downside detection section 94 detects the upside/downside of the headset 90 and outputs the detection result as an upside/downside signal SUD. The upside/downside signal SUD represents whether the position of the small camera 92 is at the right-hand side or left-hand side of the user and whether the position of the small display 93 is at the right-eye side or left-eye side of the user. An image transmission section 901 adds the upside/downside signal SUD to the image signal captured by the small camera 92 and transmits the resultant image signal.

In the main component 95, an image reception section 903 receives the image signal transmitted from the image transmission section 901, which includes the upside/downside signal SUD added thereto. An image accumulation section 904 accumulates the received image signal according to a manipulation of the manipulation section 902 by the user. At this step, the accumulation is performed while considering the upside/downside of the headset 90 which is represented by the upside/downside signal SUD. Specifically, when the upside/downside signal SUD represents that the headset 90 is worn upside down, the image signal is accumulated upside down. An image transmission section 905 transmits the image signal accumulated in the image accumulation section 904. Even in the case where the image signal is not accumulated, the image transmission section 905 processes the image signal while considering the upside/downside represented by the upside/downside signal SUD and transmits the processed image.

In the headset 90, an image reception section 906 receives the image signal transmitted from the image transmission section 905 and, on the other hand, receives the upside/downside signal SUD from the upside/downside detection section 94. Then, the image reception section 906 determines the upside/downside of the received image signal and reproduces the image signal on the small display 93. That is, when the upside/downside signal SUD represents that the headset 90 is worn upside down, the received image signal is displayed upside down on the small display 93.

With such a feature, information is displayed on the small display 93 such that, as illustrated in FIG. 34, the user can always view the image with the right side up regardless of whether the headset 90 is worn for the left eye or the right eye. Further, in the case of accumulating the image, an image can be stored with the right side up for the user's view.

That is, the headset described herein includes: a headband-shape base member which can be fixed around the head of a human such that it is looped around the back of the head from one side portion to the other side portion of the head; a camera which is provided at one end of the base member and which can capture an image from an area in front of the user when the base member is fixed to the head; and a small display which is provided at the other end of the base member and which is provided in front of an eye of the human when the base member is fixed to the head.

Furthermore, the headset preferably includes: an upside/downside detection section which detects the upside/downside of the headset and outputs the detection result as an upside/downside signal; an image transmission section which adds the upside/downside signal output from the upside/downside detection section to the image signal captured by the camera and transmits the resultant image signal to an external device; an image reception section which receives an image signal from an external device and sets the upside/downside of the image signal according to the upside/downside signal output from the upside/downside detection section so as to be displayed on the small display.

Figure 35:
FIG. 35 shows an example of image capturing which is performed using the headset of FIG. 31.

In the headset of this embodiment, the small display 93 is not provided such that it blocks all the view field of the user. Thus, an image captured by the small camera 92 is displayed on the small display 93 as shown in FIG. 35, whereby the user can confirm the captured image while confirming the state of his/her surroundings. Conventionally, in the case of capturing an image with a video camera, or the like, the head of the user moves for performing a task of confirming an area to which the camera is directed by viewing a liquid crystal screen and a task of confirming the state of his/her surroundings, and therefore in many cases, a camera shake occurs in the captured image. However, in the case of capturing an image using the headset of this embodiment, the user can confirm the captured image and the state of his/her surroundings at the same time only by changing his/her sightline. Thus, it is possible to reduce the camera shake in the captured image.

As described above, according to the present invention, arrival of a mail, music information, etc., is displayed on a display provided in front of an eye, whereby the information can be confirmed in a hands-free manner, and information obtained from a plurality of devices can be controlled in an integrated fashion. Furthermore, an indication of arrival of a mail is displayed on a wearable display, whereby the content of the mail can readily be confirmed without taking out a cellular phone. Thus, the user can instantly confirm arrival of the mail without being noticed by a person he/she faces, and in addition, can confirm other information, such as the degree of importance of the received mail, etc.

What is claimed is:

1. A wearable information notifying device, comprising:
a headset having a small display which can be provided in front of an eye of a wearer;
an information reception section for communicating with an external device to receive information;

an information extraction section for extracting a portion of the information received by the information reception section which is to be displayed on the small display;

wherein the headset includes a display control section for controlling the display mode of the small display according to a given control signal; and further comprising an environment detection section for detecting an environmental state around the headset and supplying the control signal to the display control section according to the detected environmental state.

2. The wearable information notifying device according to claim 1, wherein the environment detection section detects the brightness of surroundings as the environmental state.

3. A wearable information notifying device, comprising:

a headset having a small display which can be provided in front of an eye of a wearer;

an information reception section for communicating with an external device to receive information;

an information extraction section for extracting a portion of the information received by the information reception section which is to be displayed on the small display;

wherein the headset includes a display control section for controlling the display mode of the small display according to a given control signal; and further comprising an environmental information reception section for receiving environmental information which represents an environmental state around the headset and supplying the control signal to the display control section according to the received environmental information.

4. The wearable information notifying device according to claim 3, wherein the environmental information reception section receives the velocity of a car driven by the human as the environmental information.

5. A wearable information notifying device, comprising:

a headset having a small display which can be provided in front of an eye of a wearer;

an information reception section for communicating with an external network to receive information;

an information extraction section for extracting a portion of the information received by the information reception section which is to be displayed on the small display; and an environmental information acquisition section for acquiring environmental information which represents an environmental state around the headset and supplying the acquired environmental information to the headset;

wherein the headset includes a driving mechanism for shifting the small display between a first position in front of the eye of the wearer and a second position not in front of the eye of the wearer and not blocking the wearer's view, and a drive control section for controlling an operation of the driving mechanism such that the small display is shifted from the second position to the first position when the information output from the information extraction section includes previously registered information, wherein the drive control section receives the environmental information from the environmental information acquisition section and controls a timing of the operation of the driving mechanism according to the environmental information.

6. The wearable information notifying device according to claim 5, further comprising an environmental information reception section for receiving environmental information which represents an environmental state around the headset and supplying the received environmental information to the drive control section, wherein the drive control section controls the operation of the driving mechanism while additionally considering the environmental information.

7. The wearable information notifying device according to claim 5, wherein the environmental information is information about a running state of a vehicle which the wearer drives, and the drive control section waits to perform the operation of the driving mechanism when it is determined from the environmental information that the vehicle is running.

8. The wearable information notifying device according to claim 5, wherein the environmental information is information about a vibration of the wearer, and the drive control section waits to perform the operation of the driving mechanism when it is determined from the environmental information that the wearer is walking or running.

* * * * *

UNITED STATES PATENT AND TRADEMARK OFFICE
CERTIFICATE OF CORRECTION

PATENT NO. : 7,088,234 B2 Page 1 of 1
APPLICATION NO. : 10/471638
DATED : August 8, 2006
INVENTOR(S) : Eiichi Naito et al.

It is certified that error appears in the above-identified patent and that said Letters Patent is hereby corrected as shown below:

Col. 20, Line 21, Claim 6 - Claim 6 should be previous Claim 21, not Claim 19.

Signed and Sealed this

Twenty-sixth Day of December, 2006

JON W. DUDAS
*Director of the United States Patent and Trademark Office*

UNITED STATES PATENT AND TRADEMARK OFFICE
CERTIFICATE OF CORRECTION

PATENT NO. : 7,088,234 B2
APPLICATION NO. : 10/471638
DATED : August 8, 2006
INVENTOR(S) : Eiichi Naito et al.

It is certified that error appears in the above-identified patent and that said Letters Patent is hereby corrected as shown below:

<u>Col. 20</u>

Line 21. Claim 6, should read -- The wearable information notifying device according to claim 5, wherein the information received by the information reception section in information about a mail. --

Signed and Sealed this

Sixth Day of March, 2007

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 7,088,234 B2 | Page 1 of 1 |
| APPLICATION NO. | : 10/471638 | |
| DATED | : August 8, 2006 | |
| INVENTOR(S) | : Eiichi Naito et al. | |

It is certified that error appears in the above-identified patent and that said Letters Patent is hereby corrected as shown below:

<u>Col. 20</u>

Line 21, Claim 6 should read -- The wearable information notifying device according to claim 5, wherein the information received by the information reception section is information about a mail. --

Signed and Sealed this

Twenty-fourth Day of April, 2007

JON W. DUDAS
*Director of the United States Patent and Trademark Office*